United States Patent [19]
Nitta et al.

[11] Patent Number: 5,393,622
[45] Date of Patent: Feb. 28, 1995

[54] PROCESS FOR PRODUCTION OF POSITIVE ELECTRODE ACTIVE MATERIAL

[75] Inventors: Yoshiaki Nitta; Kazunori Haraguchi, both of Osaka; Shigeo Kobayashi, Yawata; Kazuhiro Okamura, Higashiosaka; Akira Ohta, Osaka, all of Japan

[73] Assignee: Matsushita Electric Industrial Co., Ltd., Osaka, Japan

[21] Appl. No.: 13,110

[22] Filed: Feb. 3, 1993

[30] Foreign Application Priority Data

Feb. 7, 1992 [JP] Japan .................. 4-022291
Apr. 10, 1992 [JP] Japan .................. 4-090529
Sep. 14, 1992 [JP] Japan .................. 4-244390

[51] Int. Cl.⁶ .................. H01M 4/52; C01G 53/00
[52] U.S. Cl. .................. 429/223; 423/594
[58] Field of Search .................. 429/223; 423/594

[56] References Cited

U.S. PATENT DOCUMENTS 4,302,518 11/1981 Goodenough et al. .
5,110,696 5/1992 Shokoohi et al. .............. 423/594 X

FOREIGN PATENT DOCUMENTS 0468942  1/1992 European Pat. Off. .
0468942A 1/1992 European Pat. Off. .
62-90863  4/1987 Japan .
63-299056 12/1988 Japan .
240861   2/1990 Japan .
34915    3/1991 Japan .
422066   1/1992 Japan .
424831   4/1992 Japan .
4181660  6/1992 Japan .

Primary Examiner—John S. Maples
Attorney, Agent, or Firm—Stevens, Davis, Miller & Mosher

[57] ABSTRACT

A nonaqueous secondary cell is provided, which includes a positive electrode including an active material having the formula: $Li_yNi_{1-x}Me_xO_2$ where Me is one of Ti, V, Mn and Fe; the number of moles of x and y: $0.2 < y \leq 1.3$; when Me is Ti, V or Fe, $0 < x < 0.5$; and when Me is Mn, $0 \leq x < 0.6$; having a hexagonal crystal structure and lattice constants $a_0$ and $c_0$ in the ranges of 2.83 to 2.89 Å and 14.15 to 14.31 Å, respectively, as identified by X-ray diffraction pattern; a negative electrode of Li, an alloy of li or a carbon material intercalated with Li; and a nonaqueous electrolyte. The active material having the formula: $Li_yNi_{1-x}Mn_xO_2$ where the number of moles of x and y are $0 \leq x \leq 0.3$ and $1.0 \leq y \leq 1.3$ is produced by employing as starting materials an amount of a compound of divalent Mn corresponding to the number of atomic moles of Mn indicated by x, an amount of a nickel compound corresponding to the number of atomic moles of Ni indicated by $1-x$, and an amount of a lithium compound corresponding to the number of atomic moles of Li indicated by y; predrying the starting materials, subjecting to a first heat treatment in an oxidizing atmosphere and passing through a cooling stage to produce an intermediate; and subjecting the intermediate to a second heat treatment at a different temperature from that in the first treatment in an oxidizing atmosphere.

7 Claims, 18 Drawing Sheets (006)/(101) RATIO IN
DIFFRACTION PEAK INTENSITY I $Li_yNi_{1-x}Mn_xO_2$ $Li_yNi_{1-x}Mn_xO_2$ $Li_yNi_{1-x}Mn_xO_2$

PROCESS FOR PRODUCTION OF POSITIVE ELECTRODE ACTIVE MATERIAL

BACKGROUND OF THE INVENTION

1. Field of the Invention

The present invention relates to an improved nonaqueous electrolyte secondary cell using a negative electrode active material such as lithium, lithium alloys, or a carbon material intercalatable with lithium; an electrolyte such as a solution with a nonaqueous solvent; and a positive electrode active material such as a compound oxide containing lithium. More particularly, it relates to a process for producing a positive electrode active material having a hexagonal crystalline structure represented by the general formula, $Li_yNi_{1-x}Me_xO_2$ where Me is any one of Ti, V, Mn and Fe) with lattice constants, $a_o = 2.83$ to 2.89, $c_o = 14.15$ to 14.31 Å as identified from X-ray diffraction pattern, and an nonaqueous electrolyte secondary cell using the same.

There has been a vigorous demand of miniaturized secondary cells having a light weight and a high energy density to be used as an electric supply for driving electronic apparatuses such as audio and video appliances and personal computers which have been rapidly rendered portable or cordless in recent years.

For this reason, nonaqueous secondary cells, particularly, those using lithium as active material have been strongly expected to be secondary cells having specifically high voltage and high energy density.

2. Description of the Related Art

As positive electrode active materials to meet the abovementioned demand, there have been proposed layered compounds capable of being intercalated and deintercalated with lithium such as compound oxides containing main components of lithium and transition metals (referred to as lithium compound oxides hereinunder), for example, $Li_{1-x}NiO_2$ with $0 \leq x < 1$, (U.S. Pat. No. 4,302,518); $Li_yNi_{2-y}O_2$ (Japanese Patent KOKAI (Laid-open) No. 2-4302518); $Li_yNi_xCo_{1-x}O_2$ with $0 < x \leq 0.75$, $y \leq 1$ (Japanese Patent KOKAI (Laid-open) No. 63-299056). In other materials which have been proposed heretofore there are a compound oxide, $A_xM_yN_zO_2$ where A is an alkali matal, M is a transition metal, and N is at least one of Al, In and Sn with $0.05 \leq x \leq 1.10$, $0.85 \leq y \leq 1.00$, $0.001 \leq z \leq 0.10$ (Japanese Patent KOKAI (Laid-open) No. 62-90863); and a combination of a major active material, $Li_xM_yN_zO_2$ where M is at least one of transition metals and N is at least one of non-transition metals with $0.05 \leq x \leq 1.10$, $0.85 \leq y \leq 1.00$, and $0 \leq z \leq 0.10$ and a sub-active material, i.e., a lithium-copper compound oxide (Japanese Patent KOKAI (Laid-open) No. 4-2066).

Synthesis of the positive electrode active materials have been achieved, for example, by heating at temperatures in the range of 600° to 800° C. in air for $Li_yNi_{2-y}O_2$ as disclosed in Japanese Patent KOKAI (Laid-open) No. 2-40861, or by heating at 900° C. for 5 hours in air for $Li_yNiCo_{1-y}O_2$ as disclosed in Japanese Patent KOKAI (Laid-open) No. 3-49155.

Japanese Patent KOKAI (Laid-open) No. 4-181660 proposed that the synthesis of $LiMO_2$ where M is one or more selected from Co, Ni, Fe and Mn should be achieved by heating at temperatures in the range of 600° to 800° C., preferably by effecting twice the treatment at 800° C. for 6 hours. Alternatively, Japanese Patent KOKAI (Laid-open) No. 4-24831 proposed that the synthesis of $A_xM_yN_zO_2$ where A is an alkali metal, M is a transition metal and N is at least one of Al, In and Sn with $0.05 \leq x \leq 1.10$, $0.85 \leq y \leq 1.00$, and $0.001 \leq z \leq 0.10$ should be achieved, for example, by heat-treating at 650° C. for 5 hours, and then heat-treating at 850° C. for 12 hours, both in air.

EP 468 942 (A2) proposed that the synthesis of $Li_xNi_{2-(x+y)}M_yO_2$ where $0.8 \leq x \leq 1.0$, and M is any one of Co, Fe, Cr, Ti, Mn, and V, should be accomplished by dispersing nickel hydroxide in a stoichiometric excess of a solution of lithium hydroxide into a slurry, drying the slurry by spray drying, and then heat-treating at a temperature of 600° C.

With these active materials, development of practical high energy density secondary cells having a discharge voltage on the order of 4 V is being proceeded.

Among these positive electrode active materials, for example, $Li_{1-x}NiO_2$ where $0 \leq x < 1$, (referred to as $LiNiO_2$ hereunder) exhibits a potential of 4 or more relative to lithium, so that its use as a positive electrode active material allows a secondary cell having a high energy density to be realized. The charge and discharge characteristics of the cell, however, are deteriorated with increasing the number of cycles though a discharge capacity of not less than 100 mAh/g can be obtained at initial cycling stage, reaching 65% of the initial capacity after 50 cycles. Thus, there is a problem of impossibility of achieving a good discharge and discharge cycle property. There is another propose to produce a cell having an excellent cycle property by synthesizing a compound oxide represented by the aforementioned general formula, but modified by using nickel as transition metal, a part of which is replace by non-transition metal of indium, aluminum or tin, thereby obtaining an improved positive electrode active material. However, such a lithium compound oxide as containing an amount of nickel partially replaced by the aforementioned elements tends to reduce the discharge voltage, which adversely affects the characteristics of high voltage and high energy required essentially for the cells.

The charge and discharge capacity of the active materials having this type of layered structure is attributed to an great extent to the crystalline structure of the synthesized active materials. That is, if a desired crystalline active material comprises entirely such a layered crystalline structure as belonging to the space group of Rm, the maximum capacity in charging and discharging can be achieved. In most cases, however, crystalline domains having a rocksalt structure belonging to the space group of Fm3m are formed in the course of the synthesis. Thus, the domains of the rocksalt structure are produced when an insufficient amount of oxygen is provided in the thermal diffusion of the lithium during the synthesis, or when insufficient thermal vibration or insufficient period of time for the reaction to cause sufficient diffusion of the lithium into the crystalline matrix is bestowed on the lithium.

The presence of such domains diminishes extremely transfer and diffusion of the lithium ions and the number of receptive sites therefor, resulting in producing a reduction in the capacity in charging and discharging. For the reasons as described above, it is difficult to produce the active materials having the structure of the space group of R3m which allows for a higher capacity.

For example, even if the $LiNiO_2$ is subjected once or twice to heat-treating at a temperature of 600° to 800° C. for 10 hours in an atmosphere of air, as has been proposed heretofore, one can not obtain a crystalline structure comprising the perfect space group Rm as identified by the X-ray diffraction pattern shown in FIG. 1. Thus, the ratio in the peak intensity of the face (104) to the face (003) of Miller indices is higher than 1 and similarly the ratio in the peak intensity of the face (102) or (006) to the face (101) as shown in FIG. 1 is higher than 1, which are greately different from those of the structure consisting predominantly of the space group Rm as shown in FIG. 2. In addition, with respect to the lattice constants, crystal lattice parameters, $a_0$ is 2.885 Å and $c_0$ is 14.192 Å in FIG. 2 while $a_0$ is 2.905 Å and $c_0$ is 14.235 Å in FIG. 1 indicating an expansion behavior of the lattices.

From the expansion of the lattices and the difference in the peak intensity ratio as described above, it may be considered that the crystalline structure is distorted in the presence of the mixed domains of both the space groups, i.e., the R3m and the Fm3m resembling to the former in crystal parameters. Therefore, there is given a problem that the aforementioned synthetic processes can not achieve such active materials capable of providing sufficient capacity in charging and discharging.

SUMMARY OF THE INVENTION

The present invention is to provide a positive electrode active material represented by the general formula: $Li_yNi_{1-x}Me_xO_2$ where Me is any one of Ti, V, Mn and Fe; the numbers of moles of x and y: $0.2 < y \leq 1.3$; when Me is Ti, V, or Fe, $0 < x < 0.5$; and when Me is Mn, $0 \leq x < 0.6$; having a hexagonal crystalline structure and the lattice constants, $a_0$ being in the range of 2.83 to 2.89 Å, $c_0$ being in the range of 14.15 to 14.31 as identified by X-ray diffraction pattern; with y being in the range of $0.2 < y < 1.0$, when Me is Ti, V, or Fe, $0 < x < 0.5$, and when Me is Mn, $0 \leq x < 0.6$; with y being in the range of $1.0 \leq y \leq 1.3$, when Me is Ti, V, or Fe, $0 < x < 0.5$, and when Me is Mn, $0 \leq x \leq 0.3$.

Particularly, more excellent characteristics can be obtained by using a positive electrode active material represented by the general formula: $Li_yNi_{1-x}Me_xO_2$ where Me is Mn; the numbers of moles of x and y: $1.0 \leq y \leq 1.3$ and $0 \leq x \leq 0.3$; the lattice constant: $a_0$ being in the range of 2.87 to 2.89 Å and $c_0$ being in the range of 14.15 to 14.25 Å; the ratio in the peak intensity of the face (006) to the face (101) indicated by the hexagonal Miller indices, i.e., (006)/(101) is not larger than 0.60; and the magnitude of a unit cell volume being in the range of 101 to 103 Å.

The synthesis of the active materials represented by the general formula: $Li_yNi_{1-x}Mn_xO_2$ where the numbers of moles of x and y are $0 \leq x \leq 0.3$ and $1.0 \leq y \leq 1.3$ is performed by preheating the starting materials of an amount of a compound of mainly divalent manganese corresponding to the number of atomic moles of Mn indicated by x, an amount of at least one nickel compound selected from the group consisting of $Ni(OH)_2$ and $NiCO_3$ corresponding to the number of atomic moles of Ni indicated by $1-x$, and an amount of a lithium compound corresponding to the number of atomic moles of Li indicated by y, then subjecting to first heat-treatment, passing through cooling stage to produce an intermediate which is subjected to second heat-treatment at a different temperature from that in the first heat-treatment in an oxidizing atmosphere of air or oxygen.

Practically, when the starting material, lithium compound, is $LiNO_3$ hydrate, the synthesis is performed by subjecting to the first heat-treatment consisting of heat-treating at a temperature of 550° to 650° C. for 15 to 20 hours, then passing through normal (i.e. normal room) temperature to produce an intermediate, and thereafter subjecting to the second heat-treatment of heat-treating at a temperature of 700° to 800° C. for 20 to 25 hours. The X-ray diffraction pattern of an intermediate obtained by the first heat-treatment at a temperature of 550° to 650° C. as above is shown in FIG. 3. After the second heat-treatment, there was obtained the X-ray diffraction pattern as shown in FIG. 2. On the other hand, when the lithium compound is $Li_2CO_3$, the synthesis is performed by subjecting to the first heat-treatment consisting of heat-treating at a temperature of 650° to 750° C. for 15 to 20 hours, then passing through normal temperature to produce an intermediate, and thereafter subjecting to the second heat-treatment of heat-treating at a temperature of 800° to 900° C. for 20 to 25 hours. The X-ray diffraction pattern of an intermediate obtained by the first heat-treatment at a temperature of 650° to 750° C. as above is shown in FIG. 4. After the second heat-treatment, there was obtained the X-ray diffraction pattern as shown in FIG. 2.

Alternatively, when the starting material, lithium compound, is $LiNO_3$ hydrate, the synthesis is carried out by subjecting to the first heat-treatment consisting of heat-treating at a temperature of 700° to 800° C. for 20 to 25 hours, then passing through normal (i.e., normal room) temperature to produce an intermediate, and thereafter subjecting to the second heat-treatment at a temperature of 250° to 350° C. for 10 to 15 hours. The X-ray diffraction pattern of an intermediate obtained by the first heat-treatment at a temperature of 700° to 800° C. as above is shown in FIG. 5. After the second heat-treatment, there was obtained the X-ray diffraction pattern as shown in FIG. 2.

On the other hand, when the starting material, lithium compound, is $Li_2CO_3$, the synthesis is accomplished by subjecting to the first heat-treatment consisting of heat-treating at a temperature of 800° to 900° C. for 20 to 25 hours, then passing through normal (i.e., normal room) temperature to produce an intermediate, and thereafter subjecting to the second heat-treatment at a temperature of 250° to 350° C. for 10 to 15 hours. The X-ray diffraction pattern of an intermediate obtained by the first heat-treatment at a temperature of 800° to 900° C. as above is shown in FIG. 6. After the second heat-treatment, there was obtained the X-ray diffraction pattern as shown in FIG. 2.

The reasons why the active material represented by the general formula: $Li_yNi_{1-x}Me_xO_2$ where Me is any one of Ti, V, Mn and Fe, has excellent characteristics may be considered as follows:

Major cationic species, Ni(III) ions determining the lattice structure of, for example, hexagonal $LiNiO_2$ have a low spin type of electronic configuration, on the 3d level of which seven electrons are present. In such oxides, the sixth electron and the seventh one are greatly different in electronic conditions from each other. That is, if the seventh electron is removed, the Fermi level goes down to the lower orbit of two large orbits forming the 3d level so that the electronic conductivity attributable to the upper orbit is reduced and the orbit occupied varies with a variation in spin moment. As a result, the crystal fields contributing to the crystalline structure vary resulting in difficulty of maintaining the original basic hexagonal lattice structure. When the $LiNiO_2$ is used as positive electrode, therefore, repetition of the charging operation, i.e., an oxidation reaction in charging and discharging, causes undesirably gradual deterioration of the crystalline structure with a gradual diminution of its depolarizing ability. This is considered one of factors inhibiting desirable cycle characteristics.

Furthermore, a spinel oxide with Ni, e.g., $LiNi_2O_4$ is considered to be very unstable material finding little practical application owing to difficultly in realization of a higher order oxide state having six electrons on the 3d level at the time of overcharging for the reasons as described above.

According to the present invention, a Ni compound oxide containing transition metals, Ti (the number of nominal valence electrons is four) and V (the number of nominal valence electrons is five) having vacant 3d level is synthesized allowing the transition metal oxide to form a hybrid with the vacant orbitals at lower energy level, whereby a stable crystal field is obtained through exchanging function even at discharging achieving improved cycle characteristics. Moreover, a Ni compound oxide containing Mn (the number of nominal valence electrons being four to three) or Fe (the number of nominal valence electrons being three to two) is synthesized where the transition metal oxide capable of producing a mixed valence condition has partially filled two orbitals of the 3d level and the orbitals of the Ni(III) as described above which are hybridized to form partially filled bands from both metal elements, allowing for the improvement of electronic conductivity as well as for the improvement of cycle characteristics with formation of stable crystal field through exchanging function even at discharging.

Non-transition metals containing Al as have been heretofore proposed have no d orbit, while Sn and In have filled 4d level. Replacement by the former element encounters difficulties in hybridization due to a difference of the orbits from one another and replacement by the latter elements having an electronic configuration at higher energy levels than the 3d level will not be expected to provide a higher operable voltage. However, Ti, V, Mn and Fe having occupied band at the 3d level similarly to Ni will be expected to form almost the same potentials as those of the Ni oxides.

In this way, the compound oxides where various transition elements are substituted for a part of Ni are capable of forming hexagonal layered structures having lattice constants within specific limitations and their synthesis can be easily conducted.

The synthesis of this type $LiNiO_2$ having the space group Rm structure is characterized in that the compound oxide can not be directly produced by heat-treatment from the starting materials, Ni and Li compounds, but through an intermediate to attain the end product as shown in FIG. 2. When the starting material, Li compound is a nitrate, the intermediate has a configuration of a NiO compound having a main rhombohedral structure intercalated with Li ions which is produced after the starting Ni compound, e.g., $Ni(OH)_2$ or $NiCO_3$ underwent ligand exchange to form basic nickel nitrate highly reactive with alkali metals. Alternatively, when the starting material, Li compound is a carbonate, the intermediate has a configuration of a NiO compound having a main rhombohedral structure intercalated with molten Li ions which is produced directly from the starting Ni compound, e.g., $Ni(OH)_2$ or $NiCO_3$. With any one of the Li compounds, the configurations of the intermediates are of a NiO compound having a main rhombohedral structure as can be seen in FIGS. 3 and 4, and they are produced at about 600° C. for the nitrates, or at 700° C. for the carbonates as identified by means of a high temperature X-ray diffraction apparatus. The variation in the production temperature depending upon the type of Li salt is attributed to a difference in melting point between the former nitrate, around 260° C. and the latter carbonate, around 700° C. as confirmed by means of a differential thermal analysis.

The intermediate may be regarded as a preformer, i.e., so-called precursor, to be transformed into the space group Rm structure. That is, it has the identical closest packing structure with oxygen atoms to that of the NiO type having the main rhombohedral structure, and moreover, has Li sites in the vicinity of Ni and O atoms so that it is considered liable to be transformed into the Rm structure. The transformation of the intermediate into the Rm structure requires a higher temperature than the temperature of the synthesis of the intermediate, and for example, it is achieved at 700° C. or more for the nitrates and at 800° C. or more for the carbonates as identified by means of the high temperature X-ray diffraction apparatus. The temperature of above 950° C. made both the intermediates to have a different crystalline structure from the Rm which could not be identified. Therefore, the upper limit of heat-treatment temperature should be 950° C.

After the intermediates are produced, retention of the heat-treatment temperature for additional time period, or an increase in the heat-treatment temperature were expected to yield an active material having good space group Rm structure for the reasons as described above, but did not produce good active materials compared to those obtained by cooling to normal temperature, then mixing and subjecting to the second heat-treatment. This indicates that it is important that diminution of thermal vibration through cooling causes termination of a series of reactions such as excess atomic transfer and transition, correcting the arrangement of metals and oxygen atoms and preventing partial transformation of the structure into the Rm structure, and that the bulk of an active material is homogenized by milling and mixing the sintered product. It is important, therefore, conducting the first heat-treatment, cooling to normal temperature to produce an intermediate and then conducting again heat-treatment. In contrast, when the space group Rm structure is to be formed in the intermediate, NiO compound intercalated with Li, without cooling to normal temperature, it is difficult to achieve certainly good characteristics as described above.

The active materials which are produced by one-step heat-treatment intending to directly form the Rm structure and which can not active good characteristics may be regarded as one of intermediates other than the aforementioned ones and treated to have good Rm structure by the following procedure. That is, the intermediate having imperfect Rm structure is milled and mixed as a post-step, and again subjected to heat-treatment effecting rearrangement of metal and oxygen atoms, whereby non-uniformity of the concentration of Li in the surface layer of the bulk active material can be remedied. The reheating temperature in this case should be desirably lower than the synthesis temperature for the intermediate. All the heat-treating steps are commonly performed in an oxidizing atmosphere. The Ni oxides (the number of nominal atomic valence of three) are said to have 0 to 1 electron (as one-electron reaction) on the $e_g$ orbit forming an upper band of the 3d level so that they have essentially less tendency to cause electron affinity reaction. In the course of intercalation of Li, the electron affinity reaction must inevitably occur so that the intercalation of Li into the matrix becomes difficult unless there is present a significant amount of ligand oxygen atoms.

Therefore, it is important to conduct the synthesis in an oxidizing atmosphere, preferably in an atmosphere of oxygen.

The use of the active materials represented by the general formula: $Li_yNi_{1-x}Mn_xO_2$ where the numbers of moles of x and y are $0 \leq x \leq 0.3$ and $1.0 \leq y \leq 1.3$, produced by two step heat-treating process as described above enables attainment of lithium secondary cells having good cycle characteristics and higher capacity.

DETAILED DESCRIPTION OF PREFERRED EMBODIMENTS

Figure 1:
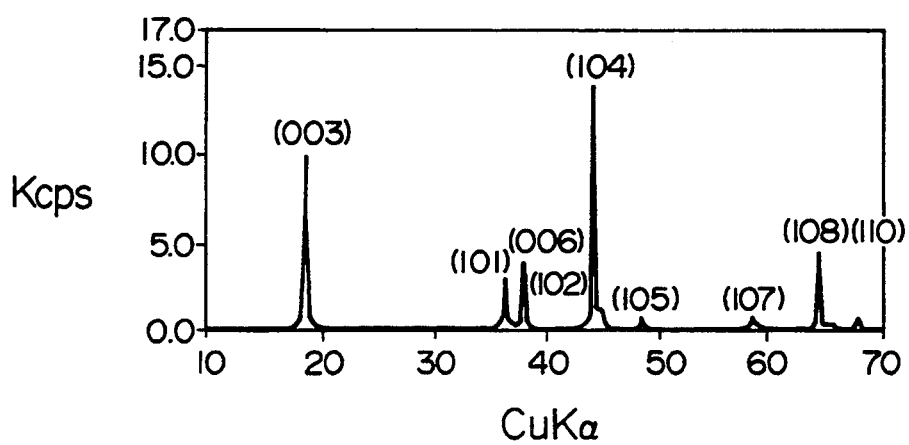
FIG. 1 is a X-ray diffraction pattern of the positive electrode active material obtained by the conventional synthesis.

Practical process for synthesizing the active materials according to the present invention and the use thereof in cells as positive electrode materials will be in detail described hereunder. The synthesis of the $Li_yNi_{1-x}Me_xO_2$ where Me is any one of Ti, V, Mn and Fe, is performed by mixing prime materials $Li_2O$ and $Ni(OH)_2$ with $TiO_2$ when the substituent transition element is Ti, or with $MnCO_3$ when it is Mn, or with $\alpha$ or $\beta$-$Fe_2O_3$ when it is Fe, in a predetermined compositional proportion, then shaping the mixture into tablets and heat-treating the tablets at a temperature of 850° C. for 20 hours in air. Preferably, the synthesis of the $Li_yNi_{1-x}Mn_xO_2$ where the numbers of moles of x and y are $0 \leq x \leq 0.3$ and $1.0 \leq y \leq 1.3$ is performed by using $Ni(OH)_2$, $Li_2CO_3$, and $MnCO_3$ as starting materials.

The active materials as above have been synthesized by various processes. Those having a value of x over 0.3 tend to have a crystalline structure exhibiting a broader peak, i.e., lower crystallinity than those having a value of x not higher than 0.3. With x being 0.4, a Mn spinel peak becomes to appear which may cause a conceivable reduction in charge and discharge capacity. If the y determining the amount of Li is lower than 1.0, the diffraction peak intensity of the face (101) relative to the face (006) of the Rm structure becomes higher than 1.0 as discussed previously with an increase of the Fm3m domain, resulting in an reduction in charge and discharge capacity. Conversely, If the y is over 1.3, an excess of Li ions is present in the surface layer of the active material so that after an electrode plate is formed, it is susceptible to corrosion.

Therefore, the $Li_yNi_{1-x}Mn_xO_2$ should preferably have a composition with $0 \leq x \leq 0.3$ and $1.0 \leq y \leq 1.3$. A process for synthesis thereof will be described under.

50 g of the starting materials prepared by mixing in a predetermined proportion was placed in an aluminum vessel and preliminarily dried at a temperature of 150° C. for 15 hours to remove adsorbed moisture, then subjecting to the first heat-treatment of heat-treating at 600° to 800° C. for 10 to 25 hours in an atmosphere of oxygen, and cooling to normal (i.e., normal room) temperature to produce an intermediate. The conditions for producing the intermediate having the same crystalline structure as that shown in FIG. 4 were selected based on the analysis of the X-ray diffraction pattern.

Figure 7:
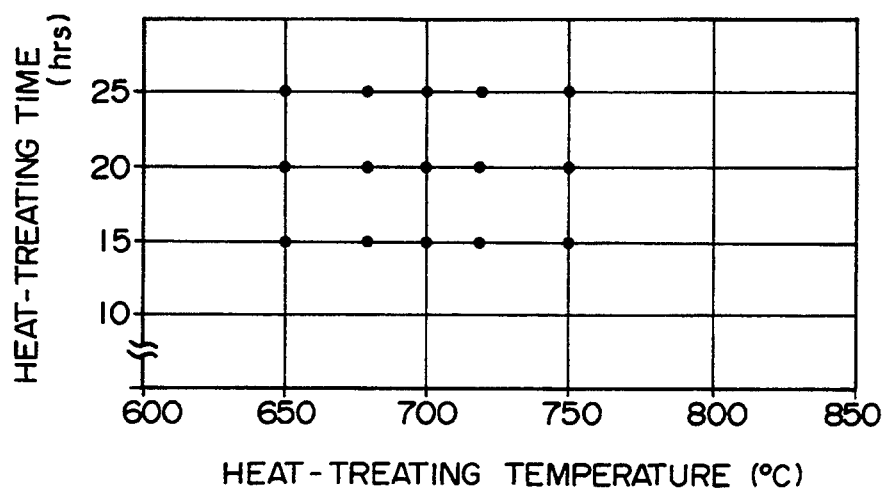
FIG. 7 is a heat-treating temperature vs. heat-treating time plot for the synthesis of the intermediate in Example 2 according to the present invention.

FIG. 7 is a plot of the occurrence of a production of the intermediate under the conditions of each heat-treating temperature and time. In the analysis of the X-ray diffraction pattern, a case where any materials having other crystalline structure than that of the intermediate such as unreacted Li compounds were included was considered unsuitable and eliminated from the plot.

It can be seen from FIG. 7 that the production of the intermediate is possible under the conditions of a heat-treating temperature in the range of 650° to 750° C. and a heat-treating time in the range of 15 to 25 hours. A temperature of 600° C. resulted in remaining unreacted Li compounds to be observed, while a temperature of 800° C. resulted in the presence of a part of the Rm structure to be observed indicating these conditions unsuitable. Even if the heat-treating temperatures are in the region making the production of the intermediate possible, a heat-treating time of 10 hours resulted in remaining unreacted Li compounds. In contrast, a heat-treating time of 25 hours was already enough for the heat-treatment and could not active any further improvement compared to the case of 20 hours so that the 20 hours may be considered sufficient to be the upper limit of the heat-treating time. From the forgoing, the firing conditions for the production of the intermediate should be preferably a heat-treating temperature in the range of 650° to 750° C. and a firing time in the range of 15 to 20 hours.

Figure 8:
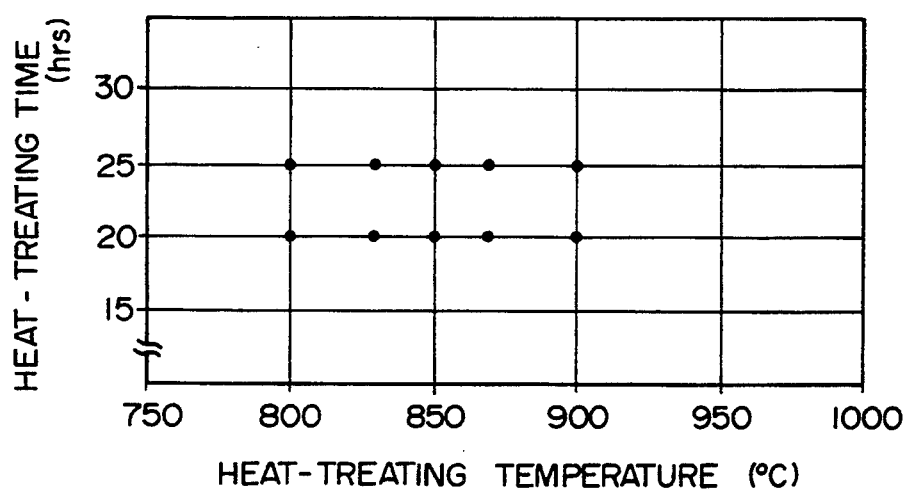
FIG. 8 is a heat-treating temperature vs. heat-treating time plot for the production of an end product having the Rm structure from the intermediate in Example 2.

Next, an intermediate produced within the aforementioned conditions, for example, by heat-treating at 700° C. for 15 hours was well ground into -100 mesh particles which were subjected to the second heat-treatment. After the second heat-treatment of heat-treating at a temperature of 750° to 950° C. for 15 to 30 hours in an atmosphere of oxygen, the particles were cooled to normal temperature. The conditions for production of the end product having the space group Rm of the identical crystalline structure to that shown in FIG. 2 were selected based on the analysis of the X-ray diffraction pattern. FIG. 8 is a plot of the occurrence of a production of the intermediate under the conditions of each heat-treating temperature and time. In the analysis of the X-ray diffraction pattern, a case where any material exhibiting other crystalline structure than the Rm of the end product, e.g., rocksalt domains having the space group Fm3m and a part of the intermediate produced by the first heat-treatment were left was considered unsuitable and eliminated from the plot.

It can be seen from FIG. 8 that the production of the end product is possible under the conditions of a heat-treating temperature in the range of 800° to 900° C. and a heat-treating time in the range of 20 to 25 hours. A temperature of 750° C. resulted in a remaining part of the unreacted intermediate which had been produced by the first heat-treatment, while a temperature of 950° C. resulted in the presence of a part of the- structure to be observed indicating these conditions unsuitable. Even if the heat-treating temperatures are in the region making the production of the end product possible, a heat-treating time of 15 hours resulted in the remaining unreacted intermediate. In contrast, a heat-treating time of 30 hours was already enough for the heat-treatment and could active almost no more than in the case of 25 hours so that the 25 hours may be considered sufficient to be the upper limit of the heat-treating time with an allowance.

From the forgoing, the heat-treating conditions for the synthesis of the end product having the Rm structure as the second heat-treatment after the formation of the intermediate should be preferably a heat-treating temperature in the range of 800° to 900° C. and a heat-treating time in the range of 20 to 25 hours in an atmosphere of oxygen.

Figure 9:
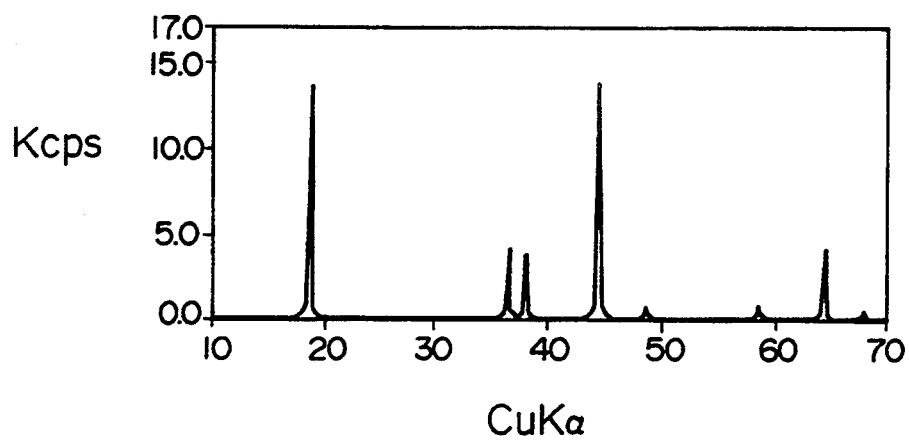
FIG. 9 is a X-ray diffraction pattern of Comparative sample.

The use of $NiCO_3$ as starting material as well as the use of air as heat-treatment atmosphere produced the identical results. In the above example, the intermediate which had been produced by firing at a temperature of 700° C. for 15 hours was employed, though those produced at heat-treating temperatures in the range of 650° to 750° C. for a heat-treating time period in the range of 15 to 20 hours could be employed to active effective results by the second heat-treatment. The thus produced positive electrode active materials were evaluated for the optimum values to be selected with cells of an experimental model. An electrode arrangement was made with a composite which was made by filling 0.4 g of a positive electrode formulation consisting of a mixture of a positive electrode active material, acetylene black and fluorinated resin adhesive in a ratio of 7:1.5:1.5 by weight into a 8 cm² of mesh electrode; a counter electrode of lithium metal; and a reference electrode of another lithium metal. As an electrolyte, there was used 50 ml of a solution which was prepared by dissolving 1 mol/l of $LiPF_6$ into a mixed solvent of ethylene carbonate and diethylene carbonate in a ratio of 1:1. Charging and discharging cycles were conducted under the conditions of a constant current of 0.5 mA/cm² and a voltage between the upper limit of 4.3 V and the lower limit of 3.0 V. For comparison on the characteristics of active materials, a contrast sample 1 was prepared by using the same starting materials, Ni(OH)$_2$, $Li_2CO_3$ and $MnCO_3$ as described above, and heat-treating at 750° C. for 10 hours in an atmosphere of oxygen. The X-ray diffraction pattern of the contrast sample is shown in FIG. 9. As can be seen from this Figure, crystalline structure having a good Rm structure could not obtained.

Discharge capacities of a single positive electrode having an active material composition, $Li_yNi_{1-x}Mn_xO_2$ where x=0 and 0.2, and y=1.0 and 1.1 are shown in Table 1.

TABLE 1

| Sample | x | y | Capacity (mAh/g) |
|---|---|---|---|
| Present invention | 0 | 1.0 | 150 |
|  |  | 1.1 | 151 |
|  | 0.2 | 1.0 | 145 |
|  |  | 1.1 | 151 |
| Contrast 1 | 0 | 1.0 | 129 |
|  |  | 1.1 | 137 |
|  | 0.2 | 1.0 | 120 |
|  |  | 1.1 | 131 |

Figure 10:
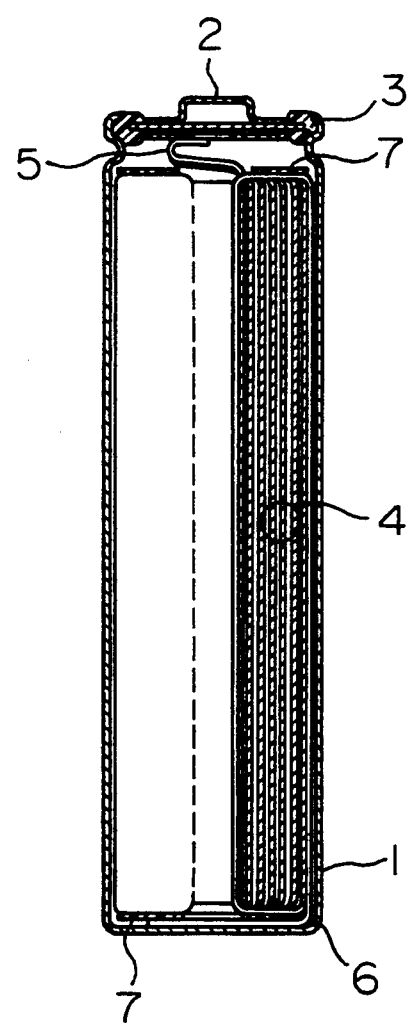
FIG. 10 is a schematic vertical cross-sectional view of the cylindrical cell according to an embodiment of the present invention.
Figure 11:
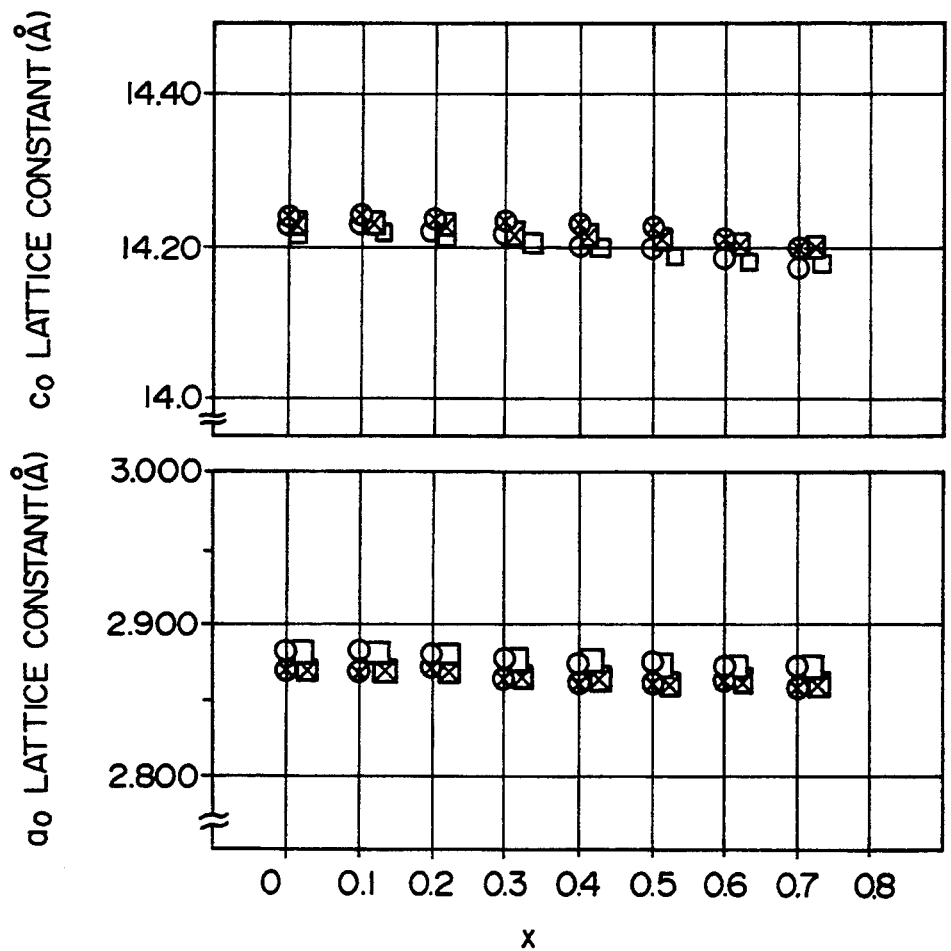
FIG. 11 shows lattice constant plots of the hexagonal $Li_yNi_{1-x}Me_xO_2$ where Me is Ti, or V with y=0.1 and 1.0.
Figure 12:
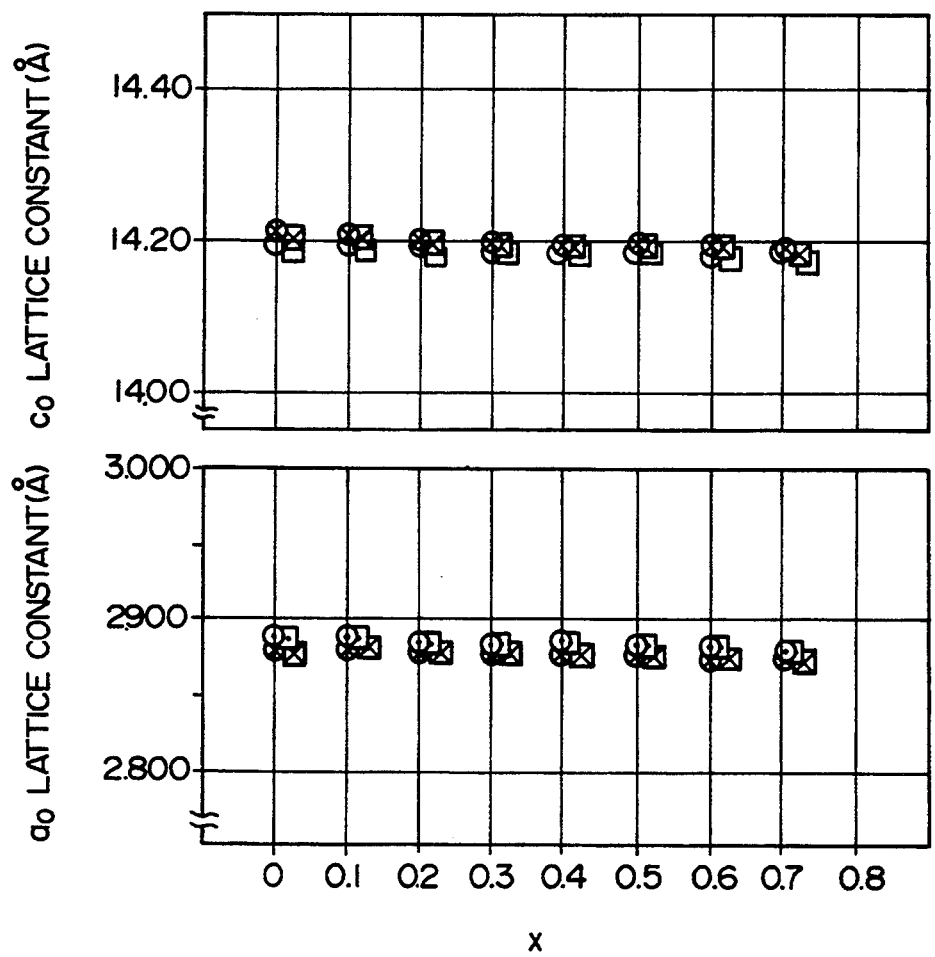
FIG. 12 shows lattice constant plots of the hexagonal $Li_yNi_{1-x}Me_xO_2$ where Me is Ti, or V with y=1.3 and 1.5.
Figure 13:
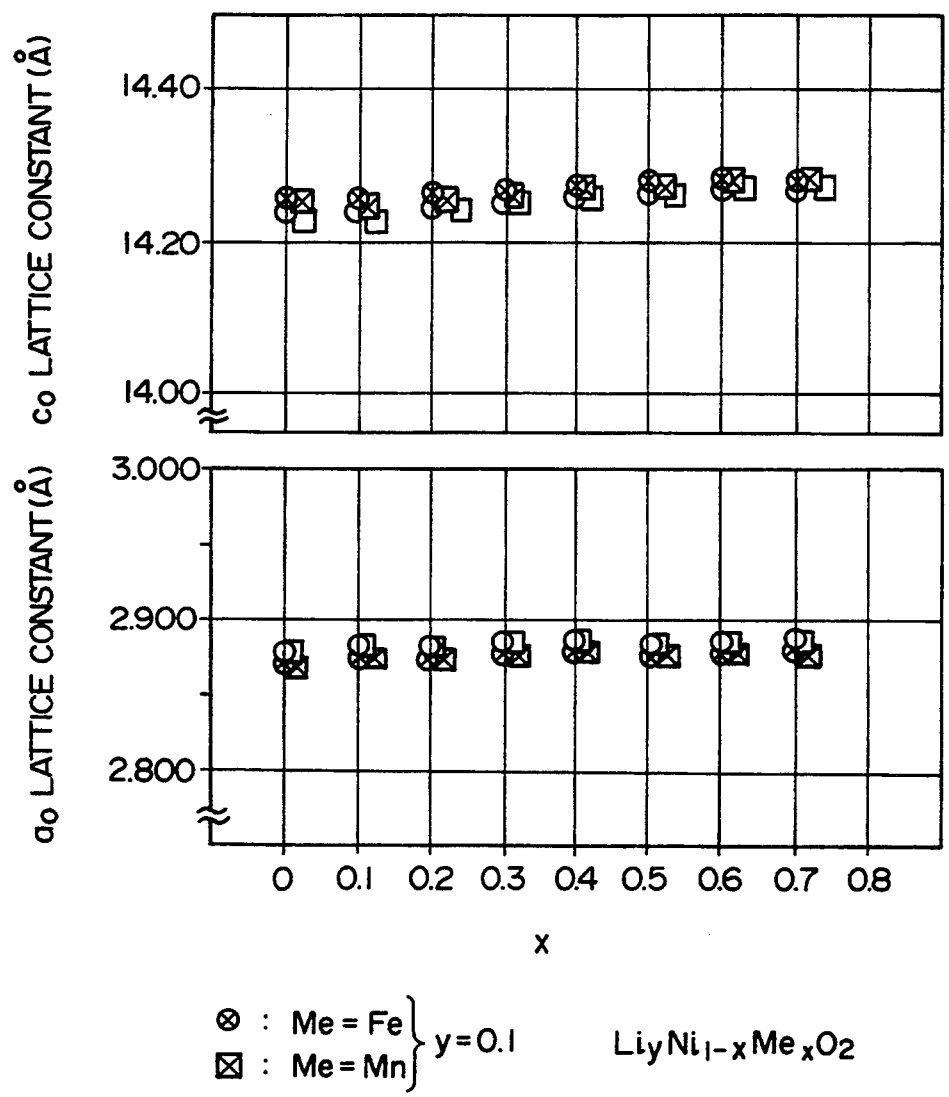
FIG. 13 shows lattice constant plots of the hexagonal $Li_yNi_{1-x}Me_xO_2$ where Me is Mn, or Fe with y=0.1 and 1.0.
Figure 14:
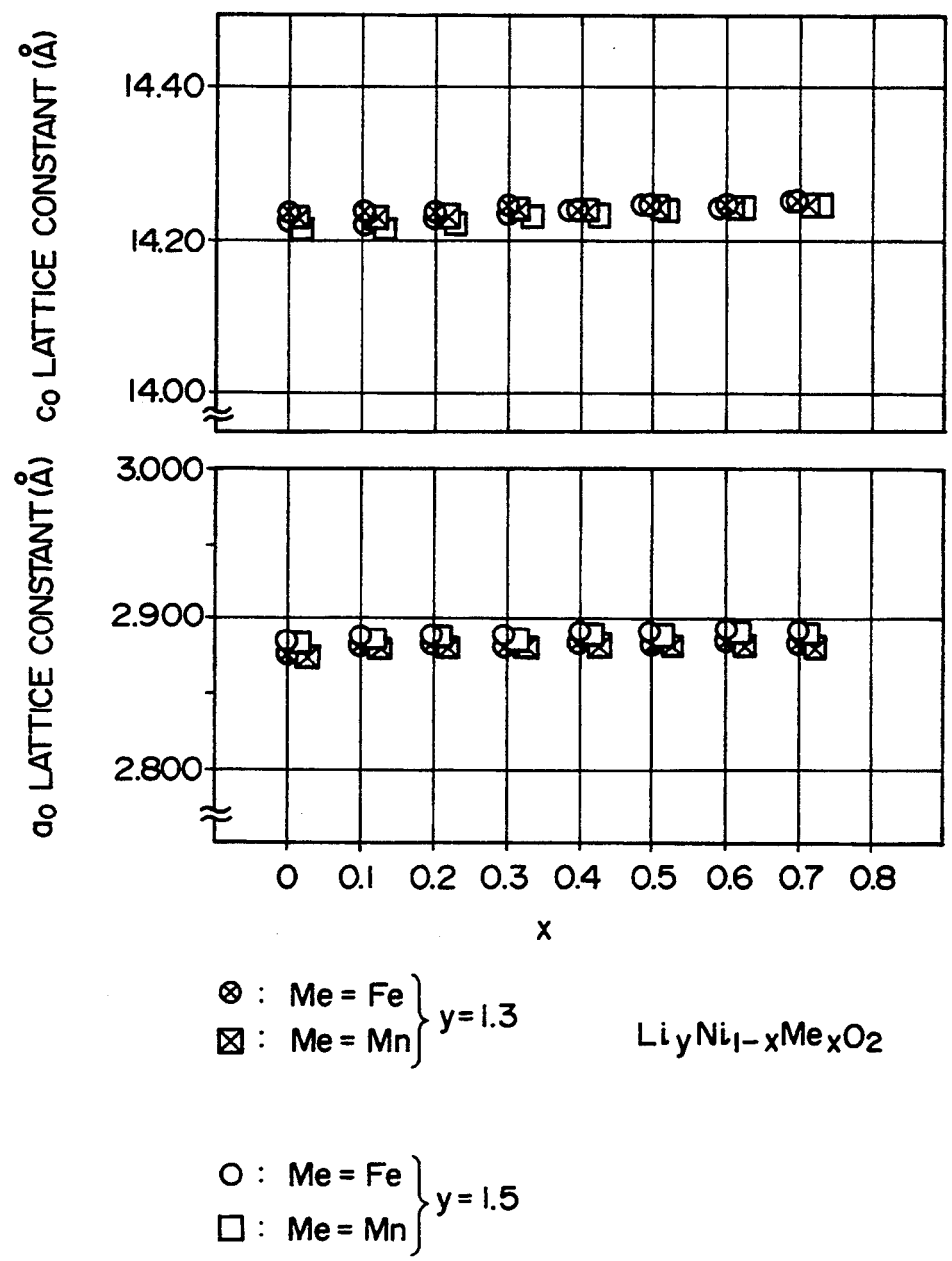
FIG. 14 shows lattice constant plots of the hexagonal $Li_yNi_{1-x}Me_xO_2$ where Me is Mn, or Fe with y=1.3 and 1.5.

As above, the use of the positive electrode active materials according to the present invention allows the cells therewith to have good cycle capacity. Cylindrical test cells with these positive electrode materials were arranged as shown in FIG. 10 and evaluated for cycle characteristics. The procedure of arranging the cylindrical test cells as shown in FIG. 10 will be described under.

100 parts by weight of a positive electrode active material, 4 parts by weight of acetylene black, 4 parts by weight of graphite and 7 parts by weight of fluorinated resin adhesive were mixed to prepare a positive electrode formation which was dispersed in an aqueous solution of carboxymethyl cellulose to produce a paste. The paste was applied onto opposite sides of an aluminum foil, dried and rolled to produce an electrode plate.

For negative electrode, 100 parts by weight of a carbon material obtained by heat-treating coke and 10 parts by weight of fluorinated resin adhesive were mixed and dispersed in an aqueous solution of carboxymethyl cellulose to produce a paste. The paste was applied onto opposite sides of a copper foil, dried and rolled to produce an electrode plate.

An electrolyte to be used was prepared by dissolving 1 mol/l of lithium perchlorate into an equivolume mixture of propylene carbonate and ethylene carbonate as solvent. This electrolyte was poured in a predetermined amount into cells which were sealed and used for the test. The test was conducted at room temperature at a constant current in charging and discharging under the conditions of a discharging current of 100 mA, a terminal charging voltage of 4.1 V and a terminal discharging voltage of 3.0 V up to 50 cycles.

As a result, the similar active materials as those obtained by the synthesis according to the present invention reached about 57% of the initial capacity, while the contrast sample 1 with x=1 reached about 50% of the initial capacity. The active materials with x=0.2 among those obtained by the synthesis according to the present invention reached about 85%. Therefore, it is believed that the use of the synthetic process of the present invention with attainment of the compound atomic valence state containing Mn makes it possible to active a higher capacity and enhanced cycle characteristics, and hence effects of improving the characteristics.

FIG. 10 shows one of the cylindrical cells where 1 designates a cell case made of a stainless steel resistant to organic electrolyte, 2 does a seal plate equipped with a salty valve, and 3 does an insulating packing. 4 designates a combination of positive and negative electrode plates with a separator being interposed therebetween which is rolled in a spiral form and received in a case. A positive electrode lead 5 is attached to the positive electrode and connected to the seal plate 2, while a negative electrode lead 6 is attached to the bottom of the cell case 1. A insulating ring 7 is provided on each of the top and the bottom of the combination of the electrodes.

EXAMPLE 1

Lattice constants of compound oxides having a composition, $Li_yNi_{1-x}Me_xO_2$ where Me is any one of Ti, V, Mn and Fe, with y being 0.1, 1.0, 1.3 and 1.5 and with varying x, were calculated based on X-ray diffraction patterns. The results are shown in FIGS. 11 to 14.

Figure 15:
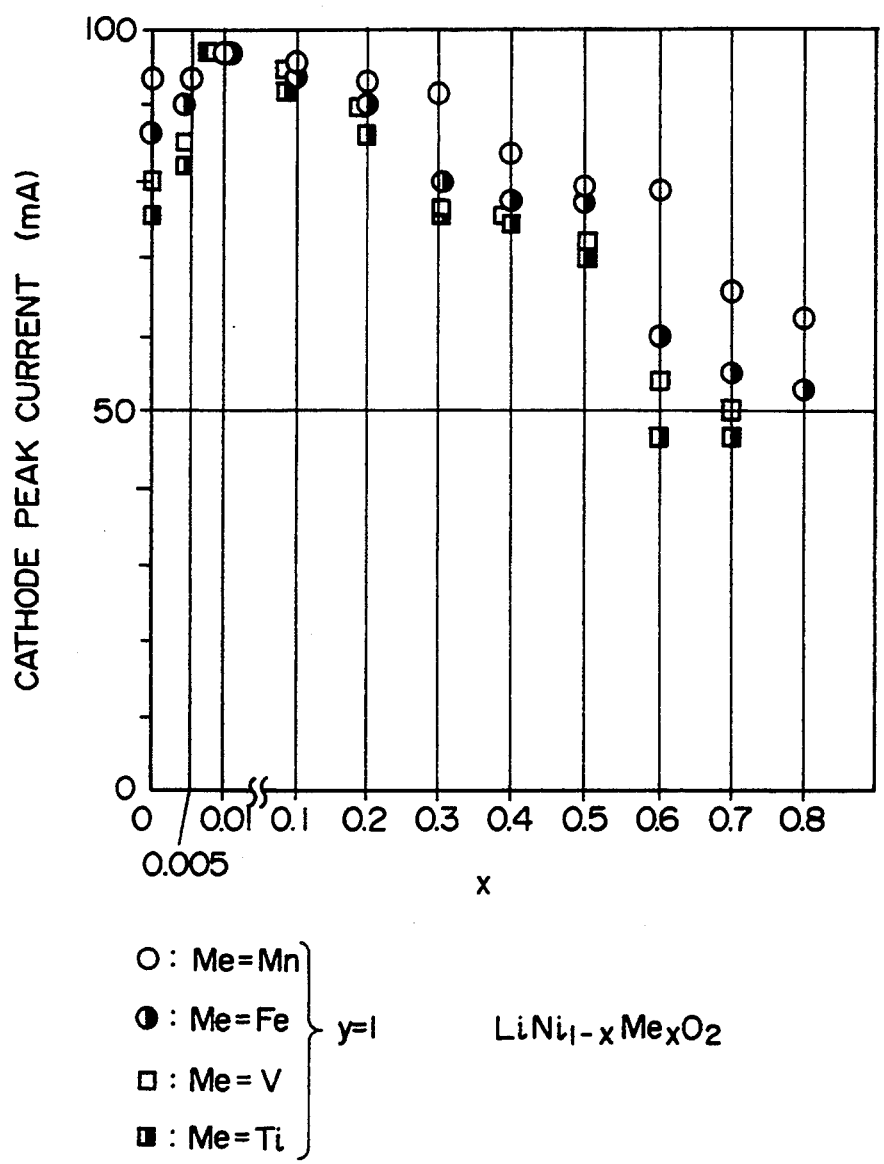
FIG. 15 shows plots of peak electric current at cathode as a function of x of the $Li_yNi_{1-x}Me_xO_2$.

As can be seen from these Figures, the hexagonal compound oxides represented by the general formula: $Li_yNi_{1-x}Me_xO_2$ where Me is any one of Ti, V, Mn and Fe, have lattice constants of $a_0$ in the range of 2.83 to 2.89 and $c_0$ in the range of 14.15 to 14.31. In order to select optimum compositions for the positive electrode active materials, peak values of cathode response currents and a voltage width corresponding to the half width of a current wave peak were evaluated by conducting a potential scanning across the sample electrodes. A sample electrode arrangement was made with a composite which was made by filling an electrode formulation consisting of a mixture of a positive electrode active material, acetylene black and fluorinated resin adhesive in a ratio of 7:1.5:1.5 by weight into a 8 $cm^2$ of electrode; a counter electrode of lithium metal; and a reference electrode of another lithium metal. As an electrolyte, there was used a solution which was prepared by dissolving 1 mol/l of $LiPF_6$ into a mixed solvent of ethylene carbonate and diethylene carbonate in a ratio of 1:1. The scanning was conducted at a speed of 2 mV/s and at a voltage in the range of 3.1 V to 4.5 V. With y=1.0, the peak value of the cathode response current for each value of the x is shown in FIG. 15. As can be seen from the FIG. 15, the hexagonal compound oxides represented by the general formula, $Li_yNi_{1-x}Me_xO_2$ where Me is any one of Ti, V, Mn and Fe, are good with Ti, V and Fe ($0<x<0.5$), and with Mn ($0 \leq x < 0.6$). Particularly, with Mn ($0 \leq x \leq 0.3$), very excellent results were obtained for the peak current value.

Figure 16:
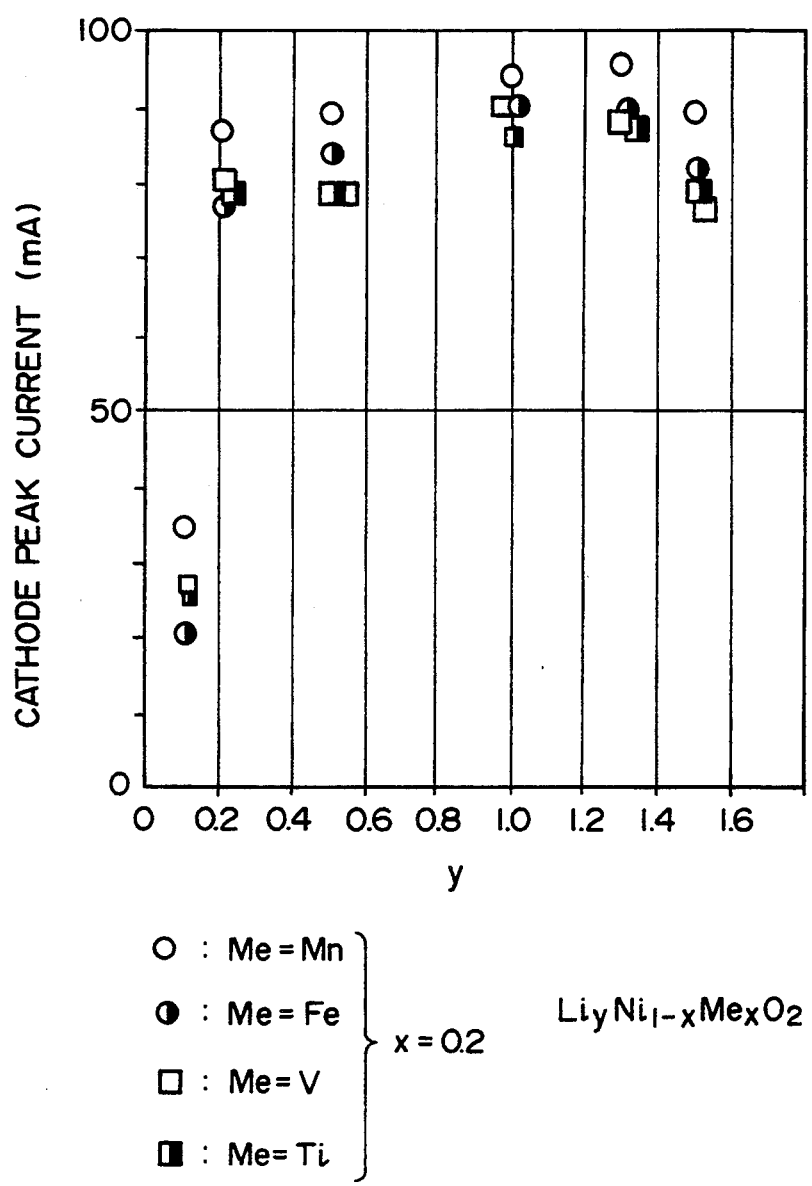
FIG. 16 shows plots of peak electric current at cathode as a function of y of the $Li_yNi_{1-x}Me_xO_2$.

Selecting x=0.2 among the values of x resulting in the hexagonal materials having good characteristics, the peak values of the cathode response current with varying y are shown in FIG. 16. As can be seen from the FIG. 16, when y is 0.2 to 1.5, a characteristic exhibiting 70 mA or more can be attained and the range of 1.0 to 1.3 is most preferable. When y was 1.5, a good result was obtained. However, since an excess lithium unreacted was still left in the positive electrode, y is preferably 1.3. The samples synthesized with y=0.1 resulted in a reduction in cathode peak current to one half. From this fact, the synthesis should be accomplished under preferred conditions with the lower limit of y being 0.2, preferably 1.0 or higher and the upper limit being 1.3.

Figure 17:
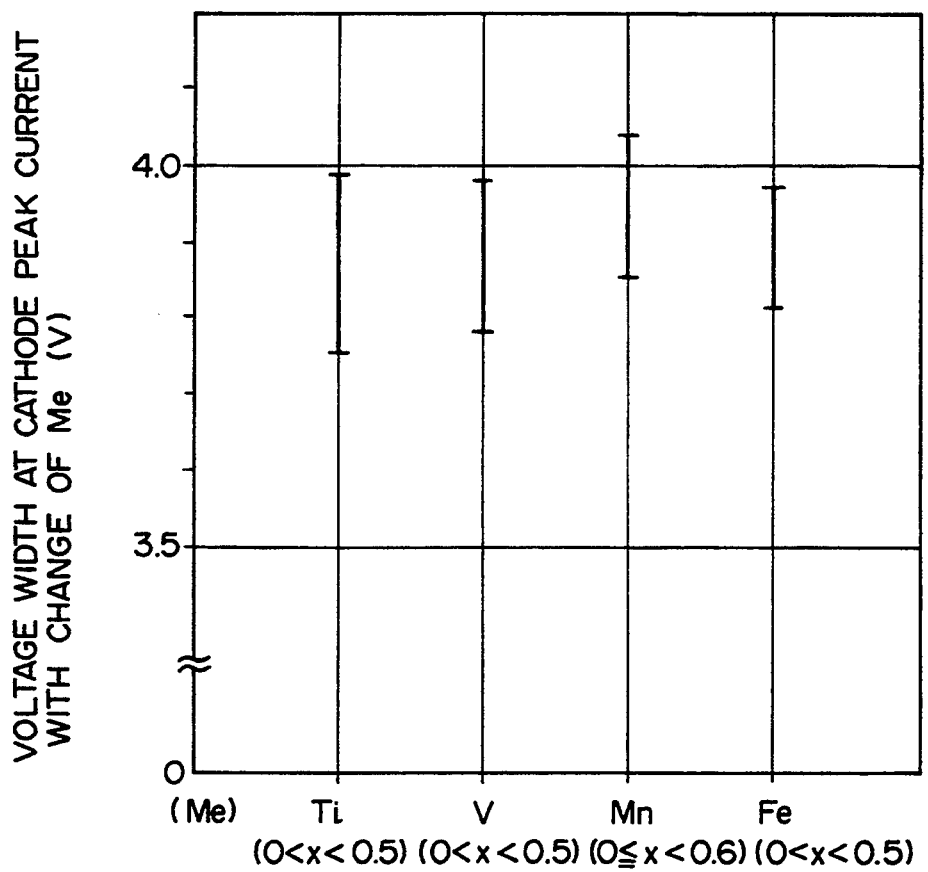
FIG. 17 is a graph showing the average voltage variation width at peak electric current at cathode with varying Me.

An average value of voltage width is shown in FIG. 17. It can be found from this Figure that when the x value is in the aforementioned range, the positive electrode active materials function as those having a high voltage of about 4 V because the average value of voltage width varies from a lower limit of 3.85 V to an upper limit of 4.03 V.

From the results as above, it is believed for hexagonal materials that the synthesis conditions should be preferably in the range of $0.2 < y \leq 1.3$, and when the substituent transition element is Mn, more preferably be $1.0 \leq y \leq 1.3$. Taking account of the results of the measurement of cathode peak current as described above, the crystalline materials synthesized with x and y being in the specified ranges had lattice constants of $a_0$ in the range of 2.83 to 2.89 and $c_0$ in the range of 14.15 to 14.31 and specifically when the substituent element is Mn, $a_0$ in the range of 2.87 to 2.89 and $c_0$ in the range of 14.15 to 14.25 corresponding to the composition with $0 \leq x \leq 0.3$. In this region, further improved characteristics may be achieved.

Next, the relationship between the crystalline structure and the composition will be discussed under.

The hexagonal materials represented by the formula, $Li_yNi_{1-x}Me_xO_2$ have a crystalline structure belonging to the space group Rm. Dependency of the crystalline structure on the y value has been a number of workers as described, for example, by J. B. Goodenough et al in J. Phys. Chem. Solids, 5 (1958) 107 where the dependency of the cell volume of the rhombohedral structure of the pure nickel hexagonal system upon the y value follows almost a negative linear function, that is, the cell volume decreases with increasing the y value. J. R. Dahn et al describe in Solid State Ionics 44 (1990) 87 that the ratio in diffraction peak intensity of the face (006) to the face (101) of Miller indices as identified from the X-ray diffraction pattern of this crystalline structure (the ratio is designated I hereunder) was calculated and concluded taking into consideration the results of Goodenough et al that the I and the rhombohedral cell volume may be placed on an increase function and conversely the I and the y value may be expressed by a negative function. This is such that the I decreases with increasing the y value. In the literature, with y=1, the I is about 0.5.

From the fact as above, the ratio in diffraction peak intensity I can be regarded as an important parameter indicating the character of crystalline structure. The present inventors have made an intensive research to find correlations of the reported results with the effects on electrochemical properties and even with the starting materials for the synthesis.

Figure 18:
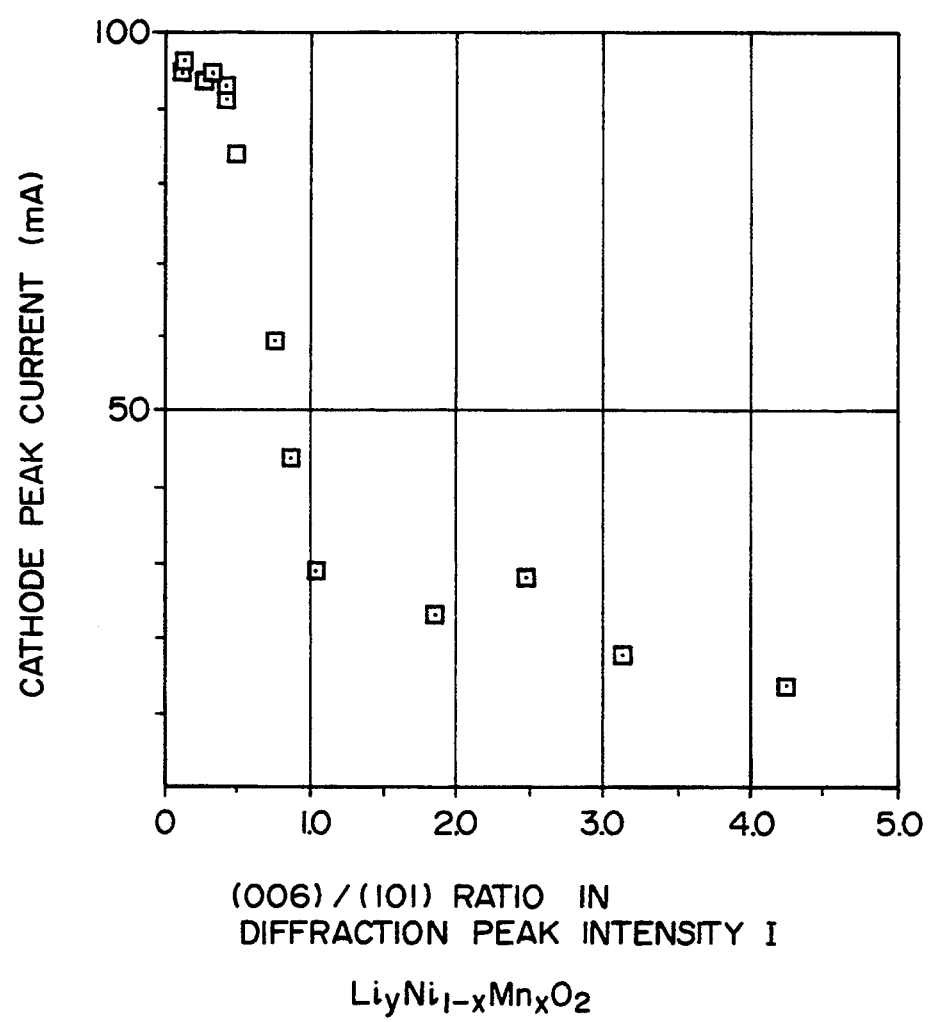
FIG. 18 is a plot showing the relationship between the peak electric current at cathode and the ratio of X-ray diffraction peak intensities $I=(006)/(101)$.

For example, a sample was synthesized by preparing a mixture of major materials, $Li_2CO_3$, $Ni(OH)_2$, and $MnCO_3$ in a predetermined proportion as starting materials and heat-treating at 850° C. for 20 hours in an atmosphere of air and evaluated for the relationship between the I and the cathode peak current value. The results are shown in FIG. 18. As can be seen from FIG. 18, as the I of the sample is increased, the cathode peak current value decreases indicating deactivation. When I is 0.6 or less, a current value not less than 80 mA is obtained indicating active state.

Figure 19:
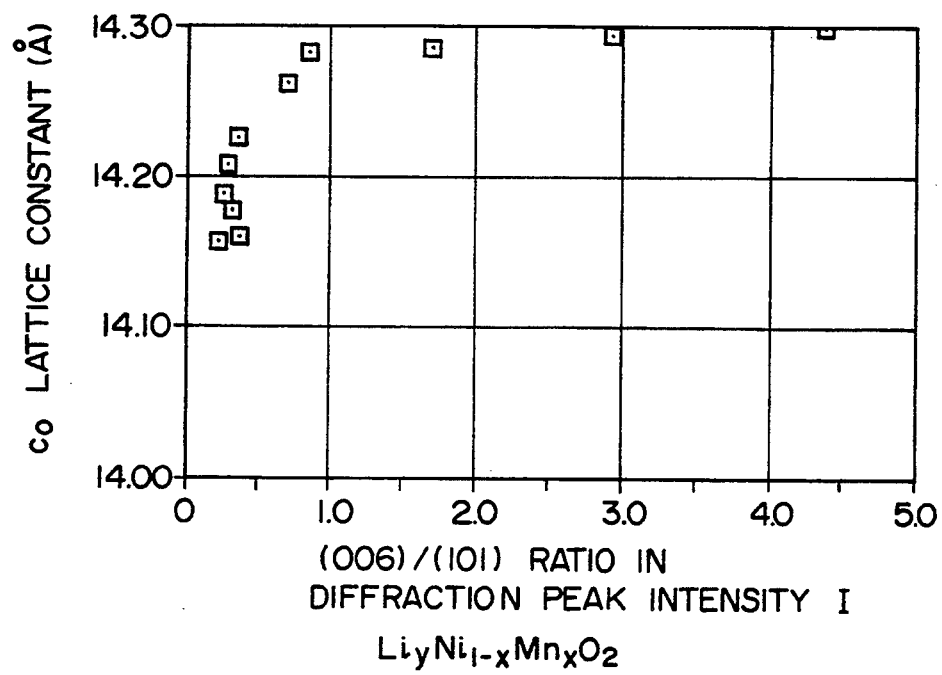
FIG. 19 is a plot showing the relationship between the lattice constant $c_0$ and the ratio of X-ray diffraction peak intensities $I=(006)/(101)$.
Figure 20:
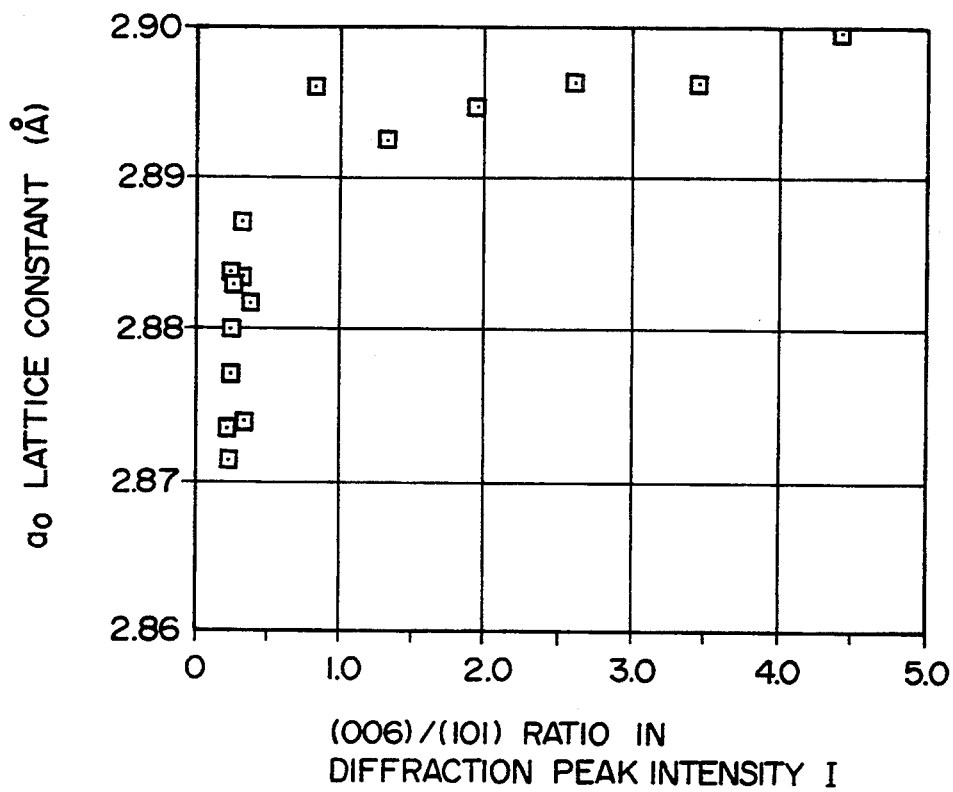
FIG. 20 is a plot showing the relationship between the lattice constant $a_0$ and the ratio of X-ray diffraction peak intensities $I=(006)/(101)$.

Next, the relationship between the I and the lattice constant is shown in FIGS. 19 and 20. It can be found from both Figures that as the I increases, the lattice constants $a_0$ and $c_0$ are rapidly increased. In the range of I not higher than 0.6 where a cathode peak current value not less than 80 mA is obtained as indicated in FIG. 18, the lattice constants are $2.87 < a_0 < 2.89$, and $14.15 < c_0 < 14.25$, which provides clearly a correlation of the electrochemical activity with the crystalline parameters. That is, there can be obtained an information that when the compound oxides synthesized satisfy the condition of the ratio in diffraction peak intensity (006)/(101)<0.6, they are electrochemically active and have the lattice constants being in the ranges of $2.87 < a_0 < 2.89$, and $14.15 < c_0 < 14.24$. The lower limits of $a_0$ and $c_0$ were determined based on this fact since any sample exhibiting $a_0$ of 2.87 or less and $c_0$ of 14.15 or less could not be experimentally synthesized. Chemical analysis also indicated that when the I was 0.6, the y value was 1.0.

Figure 21:
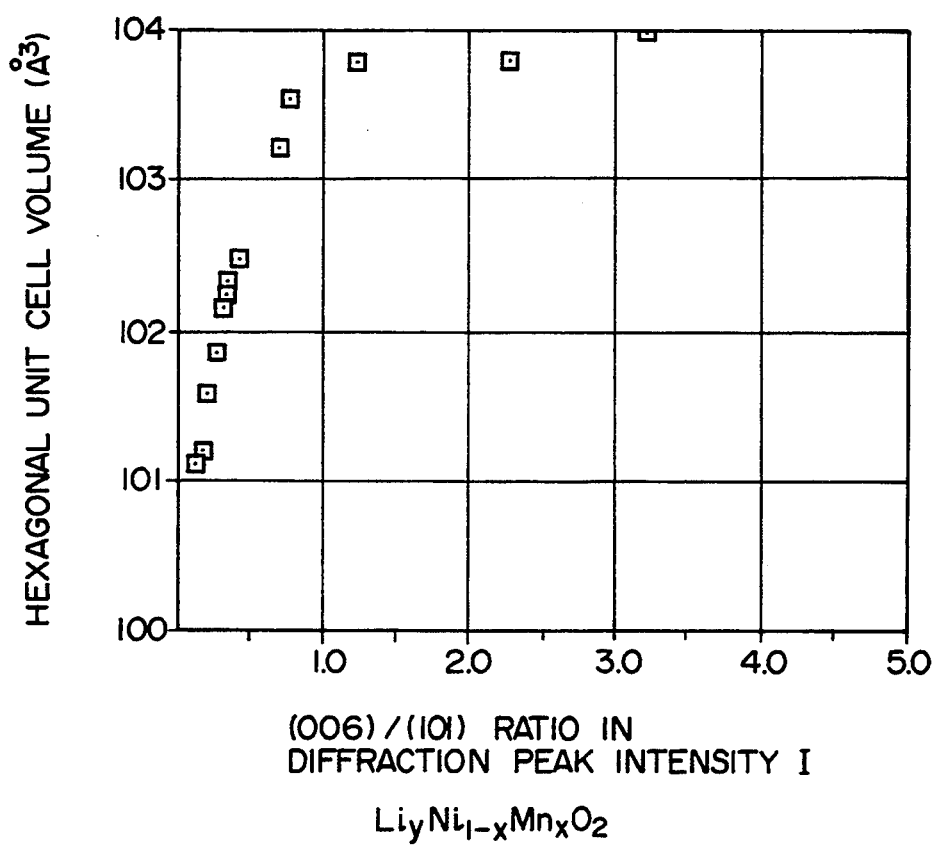
FIG. 21 is a plot showing the relationship between the hexagonal lattice unit volume and the ratio of X-ray diffraction peak intensities $I=(006)/(101)$.

Next, the relationship between the hexagonal unit cell volume and the I value is shown in FIG. 21. The unit cell volume was calculated based on the lattice constants. As a result, with the unit volume being in the range of 101 to 103 Å$^3$, the I value was not higher than 0.6 indicating the possibility of being electrochemically active. Any sample having a unit cell volume of 101 Å$^3$ or less could not experimentally synthesized.

EXAMPLE 2

The synthesis of the $Li_yNi_{1-x}Mn_xO_2$ is performed by mixing major materials, $Ni(OH)_2$ or $NiCO_3$, $LiNO_3$ hydrate or $Li_2CO_3$, and a divalent manganese compound such as $MnCO_3$ in a predetermined compositional proportion, then preliminarily dried at a temperature of 150° C. for 15 hours to remove adsorbed moisture from the starting materials, then subjecting to the first heat-treatment, cooling to normal temperature, milling and mixing, and then subjecting the resultant mixture to the second heat-treatment at different temperatures than those of the first heat-treatment. The heat-treatment should be performed in an oxidizing atmosphere, preferably in an atmosphere of oxygen.

The composition, $Li_yNi_{1-x}Mn_xO_2$ should preferably be under the conditions of $0 \leq x \leq 0.3$ and $1.0 \leq y \leq 1.3$. However, the examples below employed the basic composition where x=0 and 0.2, and y=1.0 and 1.1. Each synthesis will be described in detail hereunder.

Figure 6:
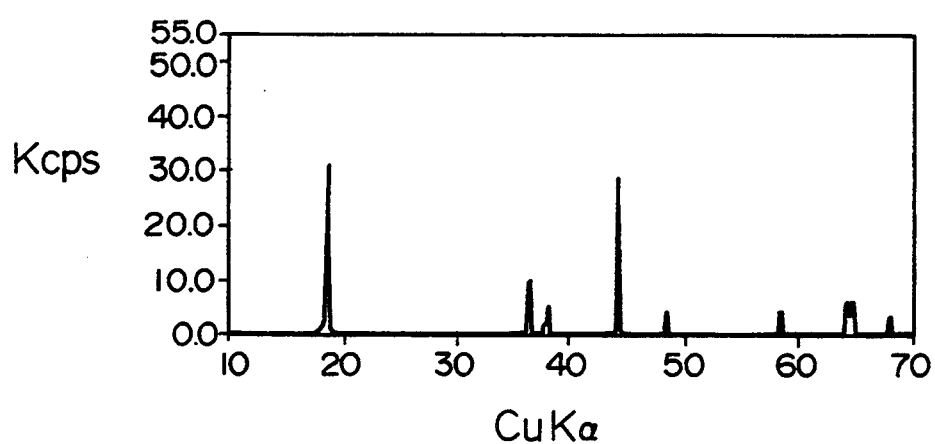
FIG. 6 is a X-ray diffraction pattern of the intermediate obtained from the starting material, $Li_2CO_3$ when the temperature of the first heat-treatment was in the range of 800° to 900° C.

In the following description, as starting materials, there were employed $Ni(OH)_2$, $LiNO_3$ and $MnCO_3$. 50 g of the starting materials prepared by mixing in a predetermined proportion was placed in an aluminum vessel, then preliminarily dried at a temperature of 150° C. for 15 hours to remove adsorbed moisture from the starting materials, subjecting to the first heat-treatment of heat-treating at a temperature of 500° to 700° C. for 10 to 25 hours in an atmosphere of oxygen, and then cooling to normal temperature to produce an intermediate. The conditions for producing the intermediate having the same crystalline structure as that shown in FIG. 6 were selected based on the analysis of the X-ray diffraction pattern.

Figure 22:
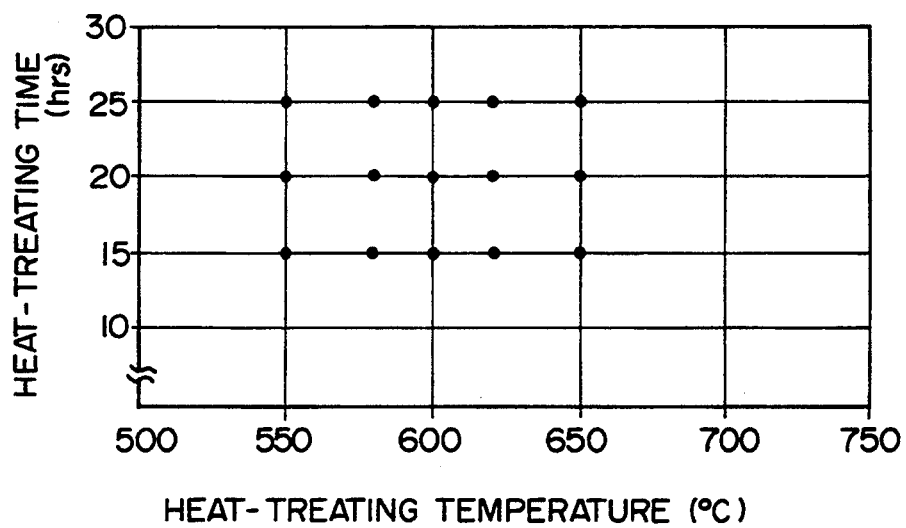
FIG. 22 is a plot showing the relationship between the heat-treating temperature and the heat-treating time employed for the synthesis of the intermediate in Example 2.

FIG. 22 is a plot of the occurrence of a production of the intermediate under the conditions of each heat-treating temperature and time. In the analysis of the X-ray diffraction pattern, a case where any materials having other crystalline structure than that of the intermediate such as unreacted Li compounds are included was considered unsuitable and eliminated from the plot. It can be seen from FIG. 22 that the production of the intermediate is possible under the conditions of a heat-treating temperature in the range of 550° to 650° C. and a heat-treating time in the range of 15 to 25 hours. A temperature of 500° C. resulted in remaining unreacted Li compounds to be observed, while a temperature of 700° C. resulted in the presence of a part of the Rm structure to be observed indicating these conditions unsuitable. Even if the heat-treating temperatures are in the region making the production of the intermediate possible, a heat-treating time of 10 hours resulted in remaining unreacted Li compounds. In contrast, a heat-treating time of 25 hours was already enough for the heat-treatment and could not active any further improvement compared to the case of 20 hours so that the 20 hours may be considered sufficient to be the upper limit of the heat-treating time. From the forgoing, the heat-treatment conditions for the production of the intermediate should be preferably a heat-treating temperature in the range of 650° to 750° C. and a heat-treating time in the range of 15 to 20 hours.

Figure 23:
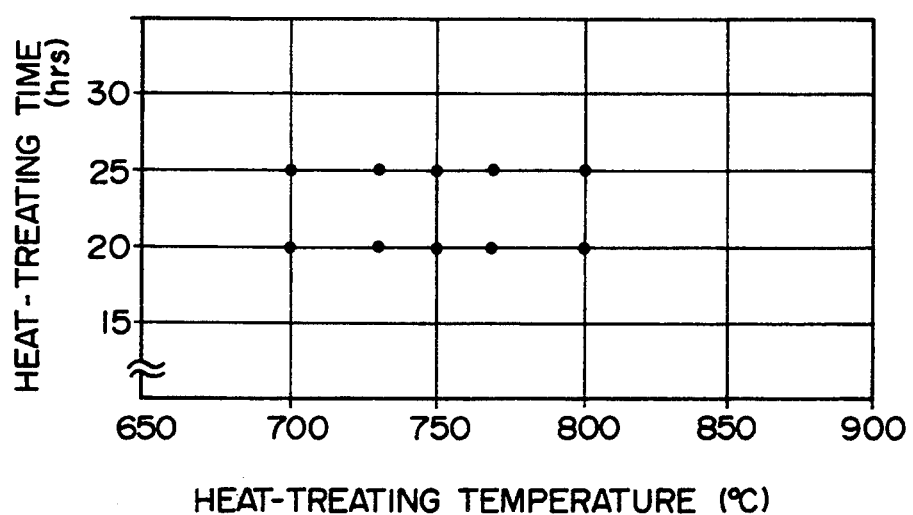
FIG. 23 is a plot showing the relationship between the heat-treating temperature and the heat-treating time for producing the end product having the Rm structure from the intermediate in Example 2.

Next, an intermediate produced within the aforementioned conditions, for example, by heat-treating at 600° C. for 15 hours was well ground into −100 mesh particles which were subjected to the second heat-treatment. After the second heat-treatment of heat-treating at a temperature of 650° to 850° C. for 15 to 30 hours in an atmosphere of oxygen, the particles were cooled to normal temperature. The conditions for production of the end product having the space group Rm of the identical crystalline structure to that shown in FIG. 2 were selected based on the analysis of the X-ray diffraction pattern. FIG. 23 is a plot of the occurrence of a production of the intermediate under the conditions of each heat-treating temperature and time. In the analysis of the X-ray diffraction pattern, a case where any material indicating a different crystalline structure from the Rm of the end product, e.g., rocksalt domains having the space group Fm3m and a part of the intermediate produced by the first heat-treatment was left was considered unsuitable and eliminated from the plot.

It can be seen from FIG. 23 that the production of the end product is possible under the conditions of a heat-treating temperature in the range of 700° to 800° C. and a heat-treating time in the range of 20 to 25 hours. A temperature of 650° C. resulted in a remaining part of the unreacted intermediate which had been produced by the first heat-treatment, while a temperature of 850° C. resulted in the presence of a part of the Rm structure to be observed indicating these conditions unsuitable. Even if the heat-treating temperatures are in the region making the production of the end product possible, a heat-treating time of 15 hours resulted in the remaining unreacted intermediate. Contrary, a heat-treating time of 30 hours was already enough for the heat-treatment and could active almost no more than in the case of 25 hours so that the 25 hours may be considered sufficient to be the upper limit of the heat-treating time. From the forgoing, the heat-treatment conditions for the synthesis of the end product having the Rm structure as the second heat-treatment after the formation of the intermediate should be preferably a heat-treating temperature in the range of 800° to 900° C. and a heat-treating time in the range of 20 to 25 hours in an atmosphere of oxygen.

Alternatively, the use of $NiCO_3$ as starting material as well as the use of air as heat-treatment atmosphere produced the identical results. In this Example 2, the intermediate which had been produced by heat-treating at a temperature of 600° C. for 15 hours was employed, though those produced at heat-treating temperatures in the range of 550° to 650° C. for a heat-treating time period in the range of 15 to 20 hours could be employed to active effective results by the second heat-treatment.

EXAMPLE 3

In the following description, as starting materials, there were employed $Ni(OH)_2$, $LiNO_3$ and $MnO_2$.

Figure 5:
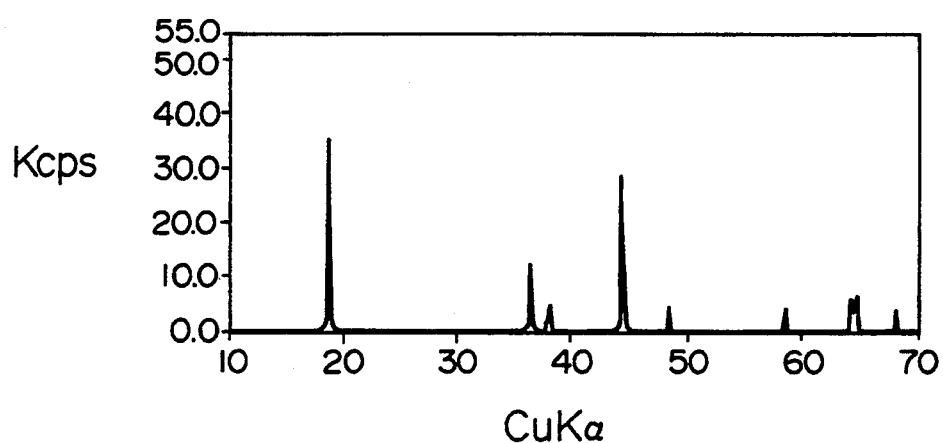
FIG. 5 is a X-ray diffraction pattern of the intermediate obtained from the starting material, $LiNO_3$ when the temperature of the first heat-treatment was in the range of 700° to 800° C.

50 g of the starting materials prepared by mixing in a predetermined proportion was placed in an aluminum vessel, then preliminarily dried at a temperature of 150° C. for 15 hours to remove adsorbed moisture from the starting materials, subjecting to the first heat-treatment of heat-treating at a temperature of 650° to 850° C. for 15 to 30 hours in an atmosphere of oxygen, and then cooling to normal temperature to produce an intermediate. The conditions for producing the intermediate having an imperfect space group Rm structure of the same crystalline structure of as that shown in FIG. 5 were selected based on the analysis of the X-ray diffraction pattern.

Figure 24:
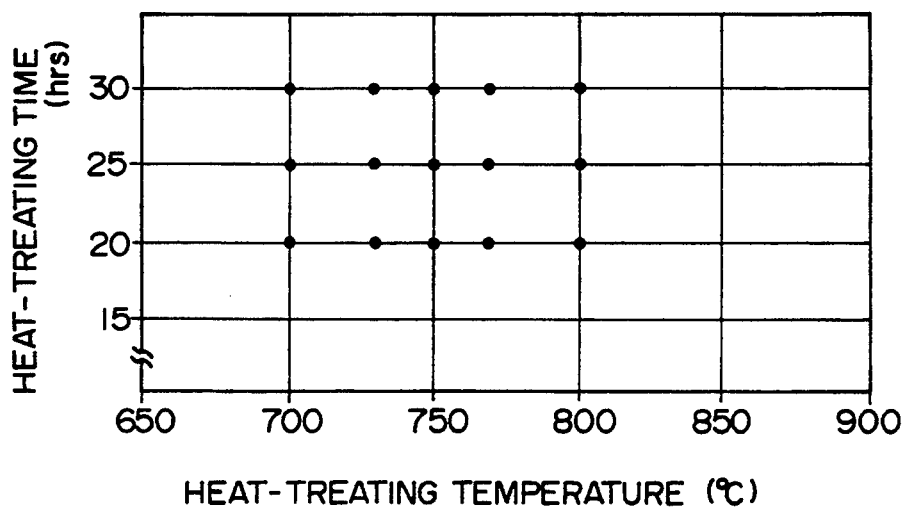
FIG. 24 is a plot showing the relationship between the heat-treating temperature and the firing time employed for the synthesis of the intermediate in Example 3.

FIG. 24 is a plot of the occurrence of a production of the intermediate under the conditions of each heat-treating temperature and time. In the analysis of the X-ray diffraction pattern, a case where any materials having other crystalline structure than that of the intermediate such as remaining NiO oxide intermediate as described in Example 2 were left or domains of the space group Fm3m structure were present was considered unsuitable and eliminated from the-plot.

It can be seen from FIG. 24 that the production of the intermediate is possible under the conditions of a heat-treating temperature in the range of 700° to 800° C. and a heat-treating time in the range of 20 to 30 hours. A temperature of 650° C. resulted in the presence of the NiO oxide intermediate as described in Example 2 to be observed, while a temperature of 650° C. resulted in the presence of a part of the Fm3m structure to be observed indicating these conditions unsuitable. Even if the heat-treating temperatures are in the region making the production of the Rm structure possible, a heat-treating time of 15 hours resulted in remaining the NiO oxide intermediate. In contrast, a heat-treating time of 30 hours was already enough for the heat-treatment and could not active any further improvement compared to the case of 20 hours so that the 20 hours may be considered sufficient to be the upper limit of the heat-treating time.

From the forgoing, the heat-treatment conditions for the production of the intermediate should be preferably a heat-treating temperature in the range of 700° to 800° C. and a heat-treating time in the range of 20 to 25 hours.

Next, an intermediate produced within the aforementioned conditions, for example, by heat-treating at 750° C. for 25 hours was well ground into −100 mesh particles which were subjected to the second heat-treatment. After the second heat-treatment of heat-treating at a temperature of 200° to 400° C. for 5 to 20 hours in an atmosphere of oxygen, the particles were cooled to normal temperature. The conditions for production of the end product having the space group Rm of the identical crystalline structure to that shown in FIG. 2 were selected based on the analysis of the X-ray diffraction pattern.

Figure 2:
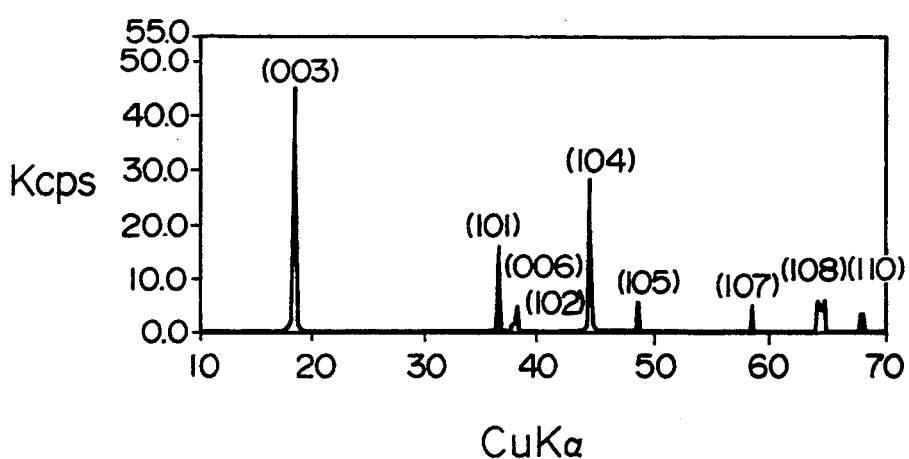
FIG. 2 is a X-ray diffraction pattern of the $Li_yNi_{1-x}Mn_xO_2$ having the space group Rm structure contemplated by the present invention.

As the intermediate obtained in this Example had the space group Rm structure almost entirely formed already, the base for the selection was the crystal parameter that the ratio in diffraction peak intensity of the face (006) to the face (101) of Miller indices in FIG. 2 was not higher than 0.40 which was much smaller than 0.06.

Figure 25:
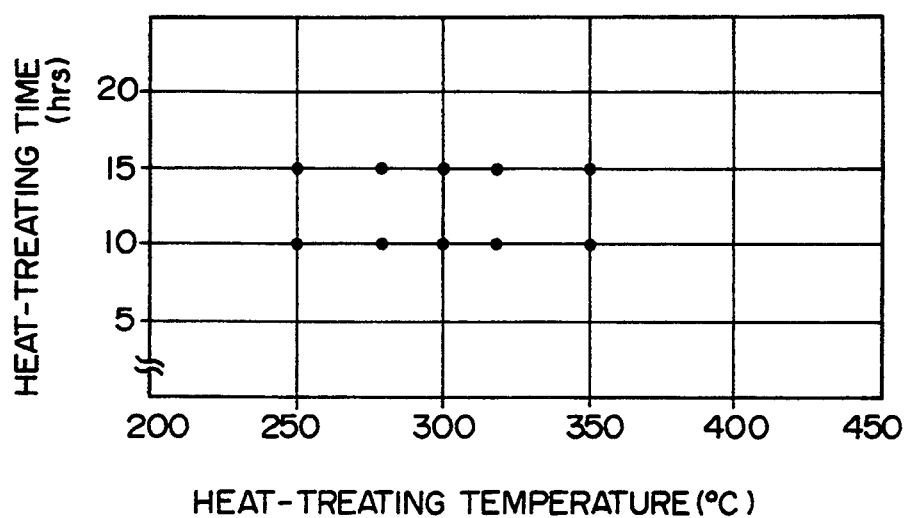
FIG. 25 is a plot showing the relationship between the heat-treating temperature and the heat-treating time for producing the end product having the Rm structure from the intermediate in Example 2.

FIG. 25 is a plot of the crystal parameter under the conditions that the ratio in diffraction peak intensity of was not higher than 0.40 depending upon each heat-treating temperature and time. As can be seen from the Figure, the crystal parameter for the end product can be achieved under the conditions of a heat-treating temperature in the range of 250° to 350° C. and a heat-treating time in the range of 10 to 15 hours. A temperature of 200° C. was not expected to active sufficient crystal growth, and conversely a temperature of 400° C. tended to increase again the crystal parameter over 0.4, which was supposed attributable to a rearrangement disorder in the crystal.

Even if the heat-treating temperatures are in the region making the production of the Rm structure possible, a heat-treating time of 5 hours was not expected to give sufficient crystal growth, while a heat-treating time of 20 hours was already enough for the heat-treatment and could active almost no more than in the case of 15 hours so that the 15 hours may be considered sufficient to be the upper limit of the heat-treating time.

From the forgoing, the heat-treatment conditions for the synthesis of the end product having the Rm structure as the second heat-treatment after the formation of the intermediate should be preferably a heat-treating temperature in the range of 250° to 350° C. and a heat-treating time in the range of 10 to 15 hours in an atmosphere of oxygen.

Alternatively, the use of $NiCO_3$ as starting material as well as the use of air as heat-treating atmosphere produced the identical results. In this Example 3, the intermediate which had been produced by heat-treating at a temperature of 750° C. for 25 hours was employed, though those produced at heat-treating temperatures in the range of 700° to 800° C. for a heat-treating time period in the range of 20 to 25 hours could be employed to active effective results by the second heat-treatment.

EXAMPLE 4

In the following description, as starting materials, there were employed $Ni(OH)_2$, $Li_2CO_3$ and $MnCO_3$.

50 g of the starting materials prepared by mixing in a predetermined proportion was placed in an aluminum vessel, then preliminarily dried at a temperature of 150° C. for 15 hours to remove adsorbed moisture from the starting materials, subjecting to the first heat-treatment of heat-treating at a temperature of 750° to 950° C. for 15 to 30 hours in an atmosphere of oxygen, and then cooling to normal temperature to produce an intermediate. The conditions for producing the intermediate having an imperfect space group Rm structure of the same crystalline structure as that shown in FIG. 6 were selected based on the analysis of the X-ray diffraction pattern.

Figure 26:
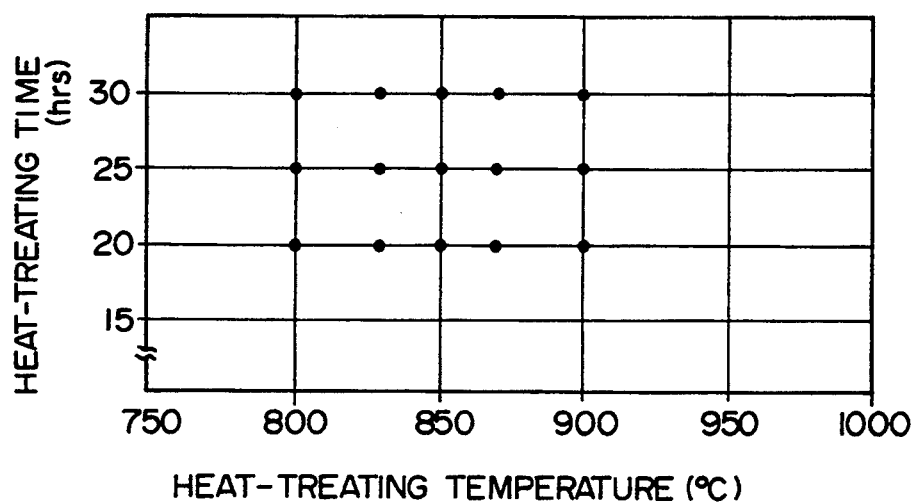
FIG. 26 is a plot showing the relationship between the heat-treating temperature and the heat-treating time employed for the synthesis of the intermediate in Example 4.

FIG. 26 is a plot of the occurrence of a production of the intermediate under the conditions of each combination of heat-treating temperature and time. In the analysis of the X-ray diffraction pattern, a case where any materials having other crystalline structure than that of the intermediate such as remaining NiO oxide intermediate were left or domains of the space group Fm3m structure were present was considered unsuitable and eliminated from the plot.

It can be seen from FIG. 26 that the production of the intermediate is possible under the conditions of a heat-treating temperature in the range of 800° to 900° C. and a heat-treating time in the range of 20 to 30 hours. A temperature of 750° C. resulted in the presence of the NiO oxide intermediate as described in Example 2 to be observed, while a temperature of 950° C. resulted in the presence of a part of the Fm3m structure to be observed indicating these conditions unsuitable. Even if the heat-treating temperatures are in the region making the production of the Rm structure possible, a heat-treating time of 15 hours resulted in remaining the NiO oxide intermediate. In contrast, a heat-treating time of 30 hours was already enough for the heat-treatment and could not active any further improvement compared to the case of 20 hours so that the 25 hours may be considered sufficient to be the upper limit of the heat-treating time.

From the forgoing, the heat-treatment conditions for the production of the intermediate should be preferably a heat-treating temperature in the range of 800° to 900° C. and a heat-treating time in the range of 20 to 25 hours.

Next, an intermediate produced within the aforementioned conditions, for example, by heat-treating at 750° C. for 25 hours was well ground into −100 mesh particles which were subjected to the second heat-treatment. After the second heat-treatment of heat-treating at a temperature of 200° to 400° C. for 5 to 20 hours in an atmosphere of oxygen, the particles were cooled to normal temperature. The conditions for production of the end product having the space group Rm of the identical crystalline structure to that shown in FIG. 2 were selected based on the analysis of the X-ray diffraction pattern.

As the intermediate obtained in this Example had the space group Rm structure almost entirely formed already, the base for the selection to be used was the crystal parameter that the ratio in diffraction peak intensity of the face (006) to the face (101) of Miller indices in FIG. 2 was not higher than 0.40.

Figure 27:
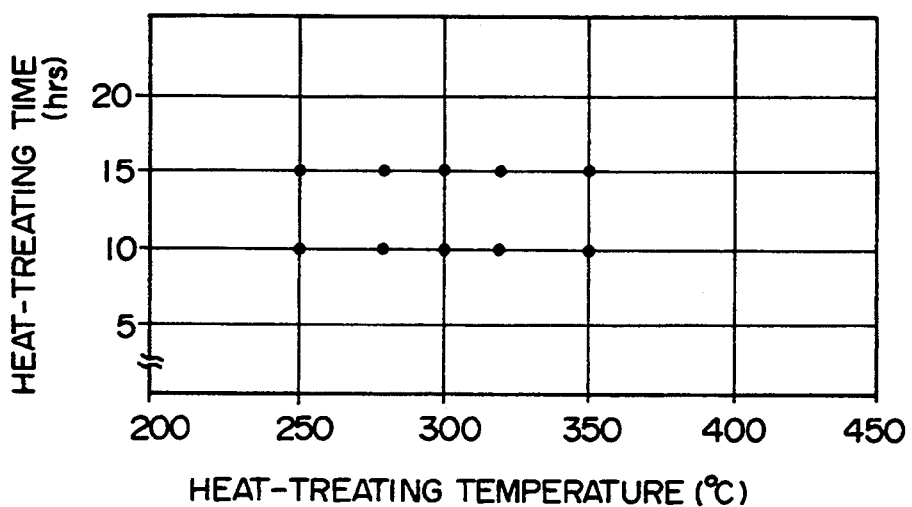
FIG. 27 is a plot showing the relationship between the heat-treating temperature and the heat-treating time for producing the end product having the Rm structure from the intermediate in Example 4.

FIG. 27 is a plot of the crystal parameter under the conditions that the ratio in diffraction peak intensity of was not higher than 0.40 depending upon each combination of heat-treating temperature and time. As can be seen from the Figure, the crystal parameter for the end product can be attained under the conditions of a heat-treating temperature in the range of 250° to 350° C. and a heat-treating time in the range of 10 to 15 hours. A temperature of 200° C. was not expected to active sufficient crystal growth, and conversely a temperature of 400° C. tended to increase again the crystal parameter over 0.4, which was supposed attributable to a rearrangement disorder in the crystal.

Even if the heat-treating temperatures are in the region making the production of the Rm structure possible, a heat-treating time of 5 hours was not expected to give sufficient crystal growth, while a heat-treating time of 20 hours was already enough for the heat-treatment and could active almost no more than in the case of 15 hours so that the 15 hours may be considered sufficient to be the upper limit of the heat-treating time.

From the forgoing, the heat-treatment conditions for the synthesis of the end product having the Rm structure as the second heat-treatment after the formation of the intermediate should be preferably a heat-treating temperature in the range of 250° to 350° C. and a heat-treating time in the range of 10 to 15 hours in an atmosphere of oxygen.

Alternatively, the use of $NiCO_3$ as starting material as well as the use of air as heat-treatment atmosphere produced the identical results. In this Example 4, the intermediate which had been produced by heat-treating at a temperature of 850° C. for 25 hours was employed, though those produced at heat-treating temperatures in the range of 800° to 900° C. for a heat-treating time period in the range of 20 to 25 hours could be employed to active effective results by the second heat-treatment.

COMPARATIVE EXAMPLE

Description will be made under about a case where $Ni(OH)_2$, $Li_2CO_3$ and $MnCO_3$ were employed as starting materials.

Figure 28:
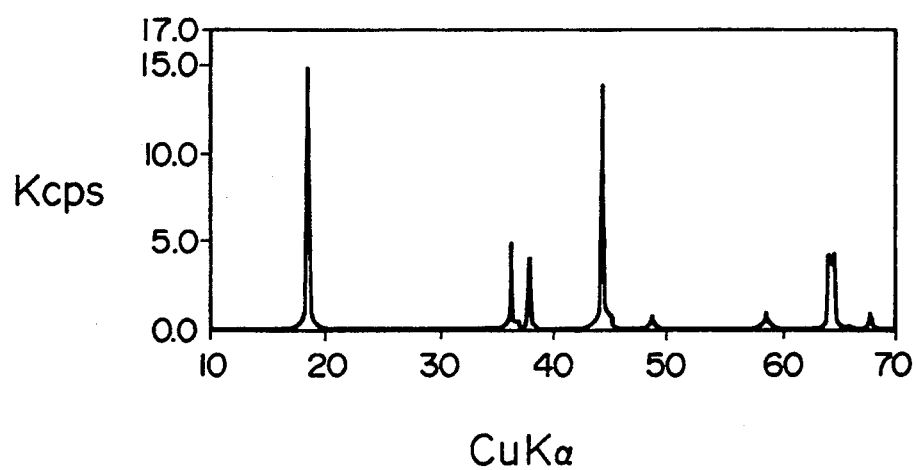
FIG. 28 is a X-ray diffraction pattern of the positive electrode active material obtained by the synthesis in Comparative Example.

50 g of the starting materials prepared by mixing in a predetermined proportion was placed in an aluminum vessel, then preliminarily dried at a temperature of 150° C. for 15 hours to remove adsorbed moisture from the starting materials, fired at a temperature of 750° C. for 10 hours in an atmosphere of oxygen, cooled to normal temperature, ground, mixed and again fired at a temperature of 750° C. for 10 hours in an atmosphere of oxygen. X-ray diffraction pattern of the resulting product is shown in FIG. 28. No crystalline product having good Rm structure was obtained.

EXAMPLE 5

The discharge capacities of the samples produced in Examples as described above and the sample of the Comparative Example after 10 cycles of charging and discharging are shown in Table 2. The active materials were of the composition, $Li_yNi_{1-x}Mn_xO_2$ where $x=0$ and 0.2, and $y=1.0$ and 1.1. The sample obtained in Example 2 was an active material which was produced by heat-treating the starting materials at 600° C. for 15 hours to produce an intermediate and post-heat-treating the intermediate at 750° C. for 25 hours. The sample produced by the most preferred process of the present invention was an active material which was produced by heat-treating the starting materials at 700° C. for 15 hours to produce an intermediate and post-heat-treating the intermediate at 850° C. for 25 hours. The sample obtained in Example 3 was an active material which was produced by heat-treating the starting materials at 750° C. for 25 hours to produce an intermediate and post-heat-treating the intermediate at 350° C. for 15 hours. The sample obtained in Example 4 was an active material which was produced by heat-treating the starting materials at 850° C. for 25 hours to produce an intermediate and post-heat-treating the intermediate at 350° C. for 15 hours.

TABLE 2

| Sample | x | y | Capacity (mAh/g) |
|---|---|---|---|
| Example 2 | 0 | 1.0 | 152 |
| | | 1.1 | 153 |
| | 0.2 | 1.0 | 148 |
| | | 1.1 | 155 |
| Most preferred process | 0 | 1.0 | 150 |
| | | 1.1 | 151 |
| | 0.2 | 1.0 | 145 |
| | | 1.1 | 151 |
| Example 3 | 0 | 1.0 | 149 |
| | | 1.1 | 152 |
| | 0.2 | 1.0 | 144 |
| | | 1.1 | 147 |
| Example 4 | 0 | 1.0 | 148 |
| | | 1.1 | 152 |
| | 0.2 | 1.0 | 145 |
| | | 1.1 | 149 |
| Contrast 1 | 0 | 1.0 | 129 |
| | | 1.1 | 137 |
| | 0.2 | 1.0 | 120 |
| | | 1.1 | 131 |
| Comparative Example | 0 | 1.0 | 132 |
| | | 1.1 | 135 |
| | 0.2 | 1.0 | 128 |
| | | 1.1 | 135 |

As can be seen from FIG. 2, the use of the synthesis process according to the present invention allows an enhancement of the discharge capacity from the conventional range of 120 to 130 mAh/g to the range of 140 to 150 mAh/g.

What is claimed is:

1. A process for producing a powdery active material for use in nonaqueous electrolyte secondary cells, said active material being represented by the formula: $Li_yNi_{1-x}Mn_xO_2$ where the numbers of moles of x and y are $0 < x \leq 0.3$ and $1.0 \leq y \leq 1.3$, said process comprising:

(a) employing as starting materials a compound of divalent manganese, a nickel compound, and a lithium compound, said compounds being present in amounts that will result in a final product satisfying $Li_yNi_{1-x}Mn_xO_2$, wherein $0 \leq x \leq 0.3$ and $1.0 \leq y \leq 1.3$, mixing said starting materials;

(b) predrying said starting materials;

(c) subjecting said predried materials to a first heat-treatment for Li-doping;

(d) terminating the Li-doping;

(e) cooling said heat-treated materials to room temperature to produce an intermediate; and (f) subjecting said intermediate to a second heat-treatment at a different temperature from that in said first heat-treatment;

said heat-treatments being conducted in an oxidizing atmosphere.

2. The process according to claim 1 for producing a powdery active material represented by the formula: $Li_yNi_{1-x}Mn_xO_2$ where $0 < x \leq 0.3$ and $1.0 \leq y \leq 1.3$, where said oxidizing atmosphere is air.

3. The process according to claim 1 for producing a powdery active material represented by the formula: $Li_yNi_{1-x}Mn_xO_2$ where $0 < x \leq 0.3$ and $1.0 \leq y \leq 1.3$, where said oxidizing atmosphere is oxygen.

Figure 3:
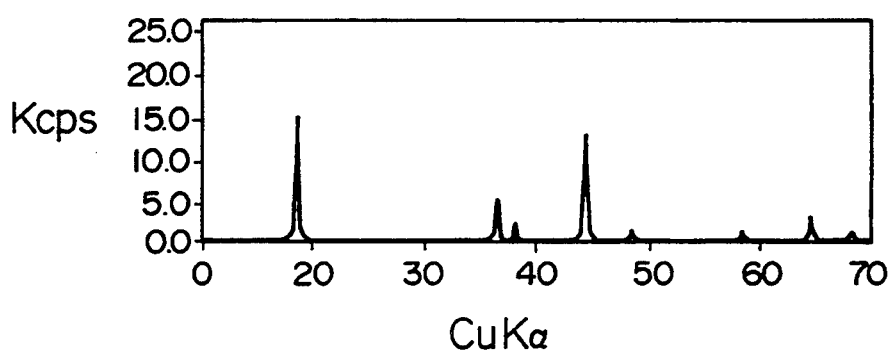
FIG. 3 is a X-ray diffraction pattern of the intermediate obtained from the starting material, $LiNO_3$ when the temperature of the first heat-treatment was in the range of 550° to 650° C.

4. The process for producing a powdery active material for use in nonaqueous electrolyte secondary cells according to claim 1, wherein step (b) comprises predrying said starting materials at 150° C. for 15 hours;

step (c) comprises subjecting said predried materials to a first heat-treatment of heat-treating at a temperature of 550° to 650° C. for 15 to 20 hours;

step (e) comprises passing said heat-treated materials through normal room temperature to produce an intermediate having the crystalline structure as identified by the X-ray diffraction pattern shown in FIG. 3; and step (f) comprises subjecting said intermediate to a second heat-treatment of heat-treating at a temperature of 700° to 800° C. for 20 to 25 hours to produce an end product having the crystalline structure as identified by the X-ray diffraction pattern shown in FIG. 2;

said heat-treatments being conducted in an oxidizing atmosphere of air or oxygen.

Figure 4:
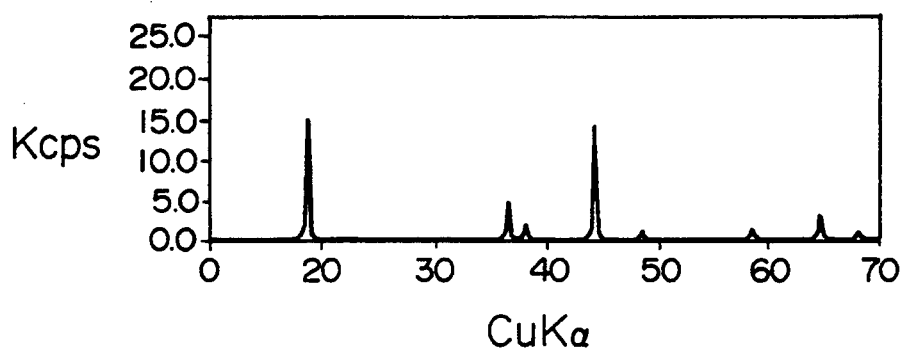
FIG. 4 is a X-ray diffraction pattern of the intermediate obtained from the starting material, $Li_2CO_3$ when the temperature of the first heat-treatment was in the range of 650° to 750° C.

5. The process for producing a powdery active material for use in nonaqueous electrolyte secondary cells according to claim 1, wherein:

step (b) comprises predrying said starting materials at 150° C. for 15 hours;

step (c) comprises subjecting said predried materials to a first heat-treatment of heat-treating at a temperature of 650° to 750° C. for 15 to 20 hours;

step (e) comprises passing said heat-treated materials through normal room temperature to produce an intermediate having the crystalline structure as identified by the X-ray diffraction pattern shown in FIG. 4; and step (f) comprises subjecting said intermediate to a second heat-treatment of heat-treating at a temperature of 800° to 900° C. for 20 to 25 hours to produce an end product having the crystalline structure as identified by the X-ray diffraction pattern shown in FIG. 2;

said heat-treatments being conducted in an oxidizing atmosphere of air or oxygen.

6. The process for producing a powdery active material for use in nonaqueous electrolyte secondary cells according to claim 1, wherein:
- step (b) comprises predrying said starting materials at 150° C. for 15 hours;
- step (c) comprises subjecting said predried materials to a first heat-treatment of heat-treating at a temperature of 700° to 800° C. for 20 to 25 hours;
- step (e) comprises passing said heat-treated materials through normal room temperature to produce an intermediate having the crystalline structure as identified by the X-ray diffraction pattern shown in FIG. 5; and
- step (f) comprises subjecting said intermediate to a second heat-treatment of heat-treating at a temperature of 250° to 350° C. for 10 to 15 hours to produce an end product having the crystalline structure as identified by the X-ray diffraction pattern shown in FIG. 2;
- said heat-treatments being conducted in an oxidizing atmosphere of air or oxygen.

7. The process for producing a powdery active material for use in nonaqueous electrolyte secondary cells according to claim 1, wherein:
- step (b) comprises predrying said starting materials at 150° C. for 15 hours;
- step (c) comprises subjecting said predried materials to a first heat-treatment of heat-treating at a temperature of 800° to 900° C. for 20 to 25 hours;
- step (e) comprises passing said heat-treated materials through normal room temperature to produce an intermediate having the crystalline structure as identified by the X-ray diffraction pattern shown in FIG. 6; and
- step (f) comprises subjecting said intermediate to a second heat-treatment of heat-treating at a temperature of 250° to 300° C. for 10 to 15 hours to produce an end product having the crystalline structure as identified by the X-ray diffraction pattern shown in FIG. 2;
- said heat-treatments being conducted in an oxidizing atmosphere of air or oxygen.

* * * * *